(12) United States Patent
Rabhi

(10) Patent No.: US 8,291,871 B2
(45) Date of Patent: Oct. 23, 2012

(54) BALL-LIFT COMPRESSION RATIO ADJUSTMENT DEVICE FOR A VARIABLE COMPRESSION RATIO ENGINE

(76) Inventor: Vianney Rabhi, Lyons (FR)

( * ) Notice: Subject to any disclaimer, the term of this patent is extended or adjusted under 35 U.S.C. 154(b) by 292 days.

(21) Appl. No.: 12/680,627

(22) PCT Filed: Jun. 26, 2009

(86) PCT No.: PCT/FR2009/000795
§ 371 (c)(1),
(2), (4) Date: Jun. 18, 2010

(87) PCT Pub. No.: WO2010/004123
PCT Pub. Date: Jan. 14, 2010

(65) Prior Publication Data
US 2010/0288237 A1 Nov. 18, 2010

Related U.S. Application Data

(60) Provisional application No. 61/076,372, filed on Jun. 27, 2008.

(30) Foreign Application Priority Data

Jun. 26, 2008 (FR) ..................................... 08 03589

(51) Int. Cl.
*F02B 75/04* (2006.01)
(52) U.S. Cl. .................................. 123/48 B; 123/78 BA
(58) Field of Classification Search ....... 123/48 R–48 D, 123/78 R–78 D
See application file for complete search history.

(56) References Cited

U.S. PATENT DOCUMENTS

| 4,834,031 A | 5/1989 | Katoh et al. |
| 6,354,252 B1 | 3/2002 | Rabhi |
| 6,601,551 B1 | 8/2003 | Rabhi |
| 7,013,849 B2 | 3/2006 | Rabhi |

FOREIGN PATENT DOCUMENTS

| DE | 38 25 369 C1 | 5/1989 |
| DE | 10 2005 010098 A1 | 9/2006 |
| FR | 997 725 A | 1/1952 |
| FR | 2 896 539 A1 | 7/2007 |
| FR | 2 896 544 A1 | 7/2007 |
| FR | 2 919 022 A1 | 1/2009 |
| GB | 2 395 767 A | 6/2004 |
| JP | 63-105244 A | 5/1988 |
| WO | 98/51911 A1 | 11/1998 |
| WO | 00/31377 A1 | 6/2000 |
| WO | 03/008783 A1 | 1/2003 |
| WO | 2007/085739 A2 | 8/2007 |

OTHER PUBLICATIONS

International Search Report, dated Jan. 19, 2010, from corresponding PCT application.

*Primary Examiner* — Noah Kamen
(74) *Attorney, Agent, or Firm* — Young & Thompson

(57) ABSTRACT

A device for adjusting the compression ratio of a variable compression ratio engine including a hydraulic double-acting control actuator (8) including an upper chamber (121) and a lower chamber (122) and at least one actuator piston (13) connected to a control rack (7) includes: at least two balls (401, 402) or valve elements each resting on a seat (403, 404) and closing off respectively one and the other end of a transfer channel (405) connecting the upper chamber and the lower chamber of the control actuator; and lifting elements (410) making it possible to raise the balls from their seat so that the balls allow the hydraulic fluid to pass in both directions.

52 Claims, 12 Drawing Sheets

US 8,291,871 B2

BALL-LIFT COMPRESSION RATIO ADJUSTMENT DEVICE FOR A VARIABLE COMPRESSION RATIO ENGINE

FIELD OF THE INVENTION

The subject of the present invention is a ball-lift device for adjusting the compression ratio for a variable compression ratio engine comprising at least one ball or valve element resting on a seat in order to close off at least one duct connecting the upper and lower chamber of a control actuator, said ball or valve element operating as a nonreturn valve element when it is held on its seat by a spring in order to allow a hydraulic fluid to pass in only one direction, and being able to be lifted from its seat by lifting means in order to allow the hydraulic fluid to pass in both directions.

DESCRIPTION OF THE RELATED ART

According to International Patents WO98/51911, WO00/31377, WO03/008783 belonging to the Applicant, various mechanical devices are known for a variable displacement engine.

Note that International Patent WO98/51911 in the name of the Applicant describes a device used to improve the efficiency of internal-combustion piston engines used at variable load and speed by adaptation while running of their effective displacement and/or of their volumetric ratio. This type of engine being known to those skilled in the art as a "variable compression ratio engine", this name will be used in the following text.

It is known that, according to International Patent WO00/31377 in the name of the Applicant, the mechanical transmission device for a variable compression ratio engine comprises a combustion piston, secured in its lower portion to a transmission member interacting on the one hand with a rolling guidance device, and on the other hand with a gearwheel secured to a connecting rod making it possible to transmit the movement between said piston and said connecting rod.

Note that, according to International Patent WO03/008783 in the name of the Applicant, the mechanical transmission device for a variable compression ratio engine comprises at least one cylinder in which a combustion piston moves which is secured, in its lower portion, to a transmission member also called a "piston rack" interacting on the one hand by means of a small-dimension rack with a rolling guidance device, and on the other hand by means of another large-dimension rack with a gearwheel secured to a connecting rod. Said mechanical transmission device for a variable compression ratio engine also comprises at least one control rack interacting with the gearwheel, means for attaching the combustion piston to the transmission member which offer a clamping prestress, connection means which make it possible to stiffen the teeth of the racks, and means for reinforcing and lightening the structure of the gearwheel.

Note that the minimal operating clearance between the teeth of the large-dimension racks and those of the gearwheel is fixed by the location of bearing surfaces made on said large-dimension racks and on said gearwheel.

Note that, according to Patent Application FR 2 896 544, the variable compression ratio engine comprises a common cylinder head which interacts with a crankcase in order to close on the one hand the end of at least one cylinder of the engine at its combustion chamber, and on the other hand the end of at least one cylinder of a control actuator of said engine at the upper chamber of said actuator, said crankcase containing all of the components of the movable coupling of the variable compression ratio engine.

Note that, according to Patent Application FR 2 896 539 or WO2007/085739, the variable compression ratio engine has at least one lifter actuator which allows the rolling surfaces to remain permanently in contact with one another in order to control the acoustic emissions of said engine and to increase the manufacturing tolerances of its crankcase, said variable compression ratio engine having as many lifter actuators and control actuators as it has cylinders.

Note also that, according to Patents WO98/51911 and FR 2 896 539, the vertical position of the control rack of the variable compression ratio engine is controlled by a control actuator which comprises an inlet of pressurized hydraulic fluid provided in order to compensate for possible leaks from said control actuator, and in order to provide a precharge pressure designed to increase the accuracy of maintenance of the vertical-position setpoint of said control actuator by reducing the effects of the compressibility of the oil, and designed to prevent any cavitation phenomenon inside the chambers of said actuator.

It is noted that, in International Patent WO98/51911, the control actuator comprises a lower chamber and an upper chamber the displacement of which is kept identical to that of said lower chamber by virtue of an actuator spindle extender, also called "upper actuator rod". Also according to International Patent WO98/51911, the control actuator also comprises an actuator piston, valves kept in place by springs, and a control rod, the upper end of said actuator being closed by a cylinder head which comprises sealing means between said cylinder head and said upper actuator rod on the one hand and between said cylinder head and said control rod on the other hand.

As claimed in French Patent Applications FR 2 896 539 and FR 07/05237 in the name of the Applicant, the variable compression ratio engine comprises a hydraulic power unit provided on the one hand to supply to its lifter actuator(s) the hydraulic pressure necessary for them to operate and on the other hand to provide its control actuator(s) with the hydraulic pressure necessary to compensate for their possible hydraulic leaks and to increase their accuracy. It is noted that said unit is supplied with oil by the lubrication circuit of the variable compression ratio engine, via a high-pressure pump that is able to be driven by any one of the camshafts of said variable compression ratio engine, said unit then supplying the control actuator(s) and the lifter actuator(s) of said engine.

It is noted that, according to French Patent Application FR 2 896 539 or WO2007/085739 in the name of the Applicant, the hydraulic pressure provided to the control actuator may also be used to increase the speed of movement of said control actuator during operations designed to increase the volumetric ratio of the variable compression ratio engine. According to this latter variant, said hydraulic pressure is applied to the upper face of the upper rod of the control actuator by means of a chamber created in the cylinder head of said actuator.

It is noted in the patent applications and patents in the name of the Applicant that the control rod may advantageously be replaced by solenoid valves which interact with at least one sensor, so as to simplify the production of the system for controlling the compression ratio of the variable compression ratio engine.

SUMMARY OF THE PRESENT INVENTION

The device for adjusting the compression ratio with a ball or valve-element lift according to the present invention is designed to solve a set of problems associated with controlling the compression ratio as described in the various patent applications and patents in the name of the Applicant to which reference has just been made and amongst which:

The upper actuator rod which provides the upper chamber of the control actuator with a displacement that is identical to that of the lower chamber involves the production of at least one sealing gasket between said upper chamber and the cylinder head of the variable compression ratio engine. Said gasket makes it more complex to produce the variable compression ratio engine because it is housed in a groove created in the cylinder head, said groove having to be produced coaxially with the upper actuator rod. In addition to the difficulties associated with the machining precision required to produce said groove, it is difficult to ensure a good seal at the gasket because of the possible offcenterings of the upper actuator rod relative to the groove. This difficulty results on the one hand from the movements that said rod makes when the variable compression ratio engine is running, and on the other hand from the expansion of the cylinder head which moves the latter relative to the crankcase of the variable compression ratio engine, these two effects combined clearly tending to offcenter said groove relative to said rod.

As explained in the above paragraph, the upper control actuator rod poses various production problems. However, it is useful, and even indispensable, for increasing the speed of movement of the control actuator of the variable compression ratio engine during operations aimed at increasing the volumetric ratio of the engine, the hydraulic pressure then being applied to the upper face of the upper rod of the control actuator by means of a chamber created in the cylinder head of said actuator. In the prior art, removing the rod would amount to removing this function, which is impossible.

It is difficult to design solenoid valves, as a replacement for the control rod, which ensure a small pressure loss without consuming much energy or having too high a cost price, and which accommodate the impurities and various pollutants that the lubrication circuit of the variable compression ratio engine contains.

It is in order to solve various problems associated with the command and control of the compression ratio as described in the patent applications and patents in the name of the Applicant cited as reference, and notably those associated with the difficulty of production and with the cost of the upper actuator rod and with its seal with the cylinder head, and to those associated with the difficulty of satisfying the functional specification of the control solenoid valves that replace the control rod cost-effectively, that the ball-lift device for adjusting the compression ratio for a variable compression ratio engine according to the present invention proposes:

the possibility of removing the upper actuator rod in order to significantly simplify the production of the cylinder head of the variable compression ratio engine;

the retention of the function of assistance to the control actuator of the variable compression ratio engine that is necessary to increase the speed of movement of said actuator during operations aimed at increasing the volumetric ratio of said engine, despite the removal of the upper control actuator rod and of the chamber created in the cylinder head as described in Patent FR 2 896 539 in the name of the Applicant;

the replacement of the conventional solenoid valves by an adjustment device that is robust, durable and reasonably priced, compatible with the impurities and various pollutants present in the lubrication oil of the variable compression ratio engine.

BRIEF DESCRIPTION OF THE DRAWINGS

The following description with respect to the appended drawings, given as nonlimiting examples, will make it easier to understand the invention, the features that it proposes and the advantages that it is capable of providing.

DESCRIPTION OF THE INVENTION

Figure 1:
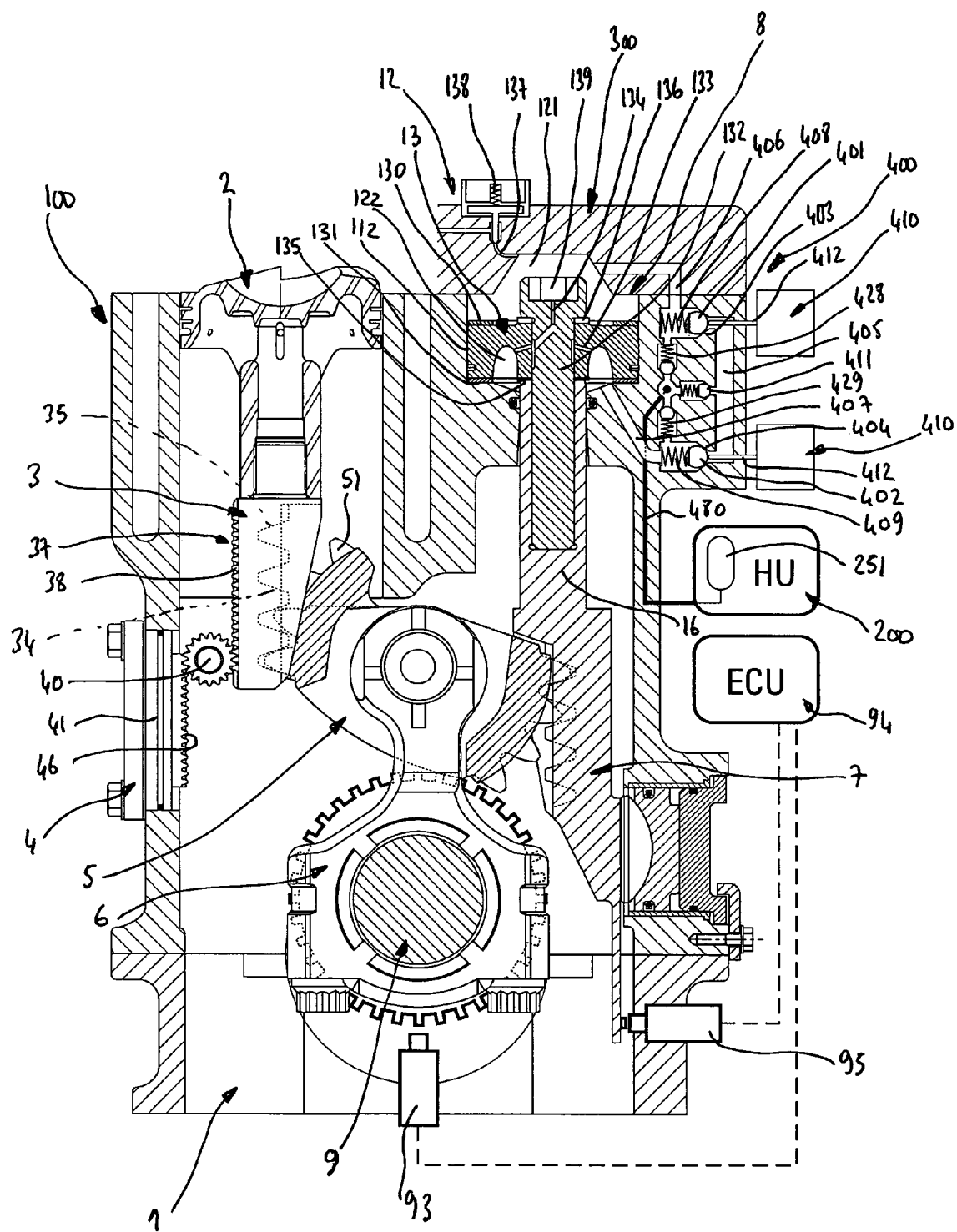
FIG. 1 is a schematic view in section illustrating the main components and their positions in the variable compression ratio engine of a ball-lift or valve-element-lift device for adjusting the compression ratio according to the present invention.

FIG. 1 shows a device 400 for adjusting the compression ratio for a variable compression ratio engine comprising means for closing off at least one duct connecting the upper chamber 121 and lower chamber 122 of a hydraulic double-acting control actuator 8, and lifting means 410 making it possible to lift the closing-off means from their seat in order to allow the hydraulic fluid to pass in both directions.

According to the patent applications and patents belonging to the Applicant, the variable compression ratio engine comprises a mechanical transmission device 1 comprising, in the lower portion of the combustion piston 2, a transmission member 3 called a "piston rack" secured to said piston and interacting, on the one hand, with a rolling guidance device 4 and, on the other hand, with a gearwheel 5.

The transmission member or piston rack 3 secured to the combustion piston 2 is provided on one of its faces with a first large-dimension rack 35 the teeth 34 of which interact with those 51 of the gearwheel 5.

The transmission member or piston rack 3 comprises, on the other side from the first rack 35, a second rack 37 of which the small-dimension teeth 38 interact with those of a roller 40 of the rolling guidance device 4.

The crankcase 100 is secured to a support 41 comprising racks 46 synchronizing the movement of the roller 40 of the rolling guidance device 4 with that of the combustion piston 2.

The gearwheel 5 interacts with a connecting rod 6 connected to a crankshaft 9 in order to transmit the movement between the combustion piston 2 and said crankshaft 9.

The gearwheel 5 interacts on the other side from the transmission member or piston rack 3 with a control rack 7 the vertical position of which relative to the crankcase 100 is driven by a control device 12 comprising the control actuator 8, and an actuator piston 13 which is guided in an actuator cylinder 112 created in the crankcase 100.

The control actuator 8 comprises, above and below the actuator piston 13, an upper chamber 121 and a lower chamber 122, said chambers having a displacement that differs from one another for the same stroke of the actuator piston 13.

The control actuator 8 consists of a lower actuator rod 16 secured to the control rack 7 and of a lock screw 132 making it possible to attach the actuator piston 13 to said lower actuator rod 16 of the control rack 7.

The lock screw 132 comprises a locking head 139 housed in the upper chamber 121 of the control actuator 8.

The actuator piston 13 of the hydraulic double-acting control actuator 8 may comprise two elastic end-of-stroke abutments 130, 131 which determine the maximum stroke of said actuator piston.

The first abutment 131 makes it possible to limit the maximum compression ratio of the variable compression ratio engine when it comes into contact with the crankcase 100 of said engine, while the second abutment 130 makes it possible to limit the minimum compression ratio of the variable compression ratio engine when it comes into contact with the cylinder head 300 of the control actuator 8 of said engine.

The actuator piston 13 of the hydraulic double-acting control actuator 8 comprises, between the lower face of said piston 13 and the lower actuator rod 16 of the control rack 7, an adjustment washer 135 which makes it possible to adjust the position of said piston 13 relative to said rack 7.

This adjustment washer 135 makes it possible to adjust the compression ratio of the variable compression ratio engine when one or the other of the two elastic end-of-stroke abutments 130, 131 comes into contact either with the crankcase 100 of said engine, this being the first abutment 131, or with the cylinder head 300 of the control actuator 8 of said engine, this being the second abutment 130.

The actuator piston 13 comprises a piston depressurizing duct 133 which connects the lower chamber 122 and the upper chamber 121 of the hydraulic double-acting control actuator 8. The piston depressurizing duct 133 allows the air forming a pocket in the lower chamber 122 to pass into the upper chamber 121.

The piston depressurizing duct 133 may consist of a space left between the actuator piston 13 and the lock screw 132 calculated to form a pressure loss limiting the flow rate of hydraulic fluid between the lower chamber 122 and the upper chamber 121 of the hydraulic double-acting control actuator 8.

The piston depressurizing duct 133 of the actuator piston 13 may comprise a considerable space left between the actuator piston 13 and the lock screw 132, said space allowing the hydraulic fluid to pass from the lower chamber 122 to the upper chamber 121 of the hydraulic double-acting control actuator 8, via a groove formed on the lower face of a depressurizing washer 136 clamped between said lock screw 132 and said actuator piston 13.

The profile, the cross section and the length of the groove are calculated to form a pressure loss limiting the passage of said fluid between the lock screw 132 and the actuator piston 13 of the hydraulic double-acting control actuator 8.

The groove formed in the depressurizing washer 136 may be in spiral form in order to have a great length, the beginning of said spiral leading into the central hole of said washer, while the end of said spiral leads into the periphery of said washer.

The piston depressurizing duct 133 of the actuator piston 13 communicates with a depressurizing capillary duct 134 formed or fitted in the body of the lock screw 132. The profile, the cross section and the length of the depressurizing capillary duct 134 are calculated to form a pressure loss limiting the passage of the hydraulic fluid between the lower chamber 122 and the upper chamber 121 of the hydraulic double-acting control actuator 8.

The hydraulic double-acting control actuator 8 may comprise an actuator depressurizing duct 137 the inlet of which is positioned at the highest point of the upper chamber 121 and the outlet of which opens into any point of the variable compression ratio engine.

The outlet of the actuator depressurizing duct 137 leads directly or indirectly into the oil sump 500 of said engine. The actuator depressurizing duct 137 may be closed off or opened by means of a depressurizing solenoid valve 138.

The variable compression ratio engine may comprise at least one position sensor 95 making it possible to measure the vertical position of the control rack 7.

The variable compression ratio engine may comprise at least one sensor detecting the passage of the piston rack 3 so as to be able to deduce therefrom the compression ratio of said engine taking account of the angular position of the crankshaft 9 at which the passage of the piston rack 3 has been detected.

The variable compression ratio engine may comprise at least one pressure sensor, not shown, which makes it possible to measure the pressure that prevails in the upper chamber 121 of the hydraulic double-acting control actuator 8.

The variable compression ratio engine may comprise at least one pressure sensor, not shown, which makes it possible to measure the pressure that prevails in a combustion chamber that the variable compression ratio engine comprises.

The variable compression ratio engine may comprise at least one crankshaft angular position sensor 93 and at least one computer 94.

The device 400 for adjusting the compression ratio according to the present invention comprises closing-off means which consist of at least two balls 401, 402 or valve elements each resting on a seat 403, 404 and respectively closing off one and the other end of a transfer channel 405, connecting by means of ducts 406, 407 incorporated into the crankcase 100 the upper chamber 121 and the lower chamber 122 of the hydraulic double-acting control actuator 8.

The balls 401, 402 act as a nonreturn valve element when they are held on their seat 403, 404 by a spring 408, 409 so as to allow the hydraulic fluid to pass in only one direction.

The device 400 for adjusting the compression ratio according to the present invention comprises lifting means 410 making it possible to lift the balls 401, 402 from their seats 403, 404 in order to allow the hydraulic fluid to pass in both directions.

The device 400 for adjusting the compression ratio comprises at least one compensating nonreturn valve element 411 allowing the hydraulic fluid to come out of the transfer channel 405 in order to return to a hydraulic power unit 200 of the variable compression ratio engine containing a pressurized reserve 251 of said fluid, but preventing said fluid from returning to said transfer channel 405.

The lifting means 410 of the device 400 for adjusting the compression ratio consist, for each ball 401, 402, of a cylindrical lifter 412 housed in the transfer channel 405.

The lifting means 410 consist of an electromechanical actuator 413 making it possible to move the cylindrical lifter 412 in longitudinal translation so that one of its ends comes into contact with and then pushes the corresponding ball 401, 402 so that it lifts from its seat 403, 404.

Figure 2:
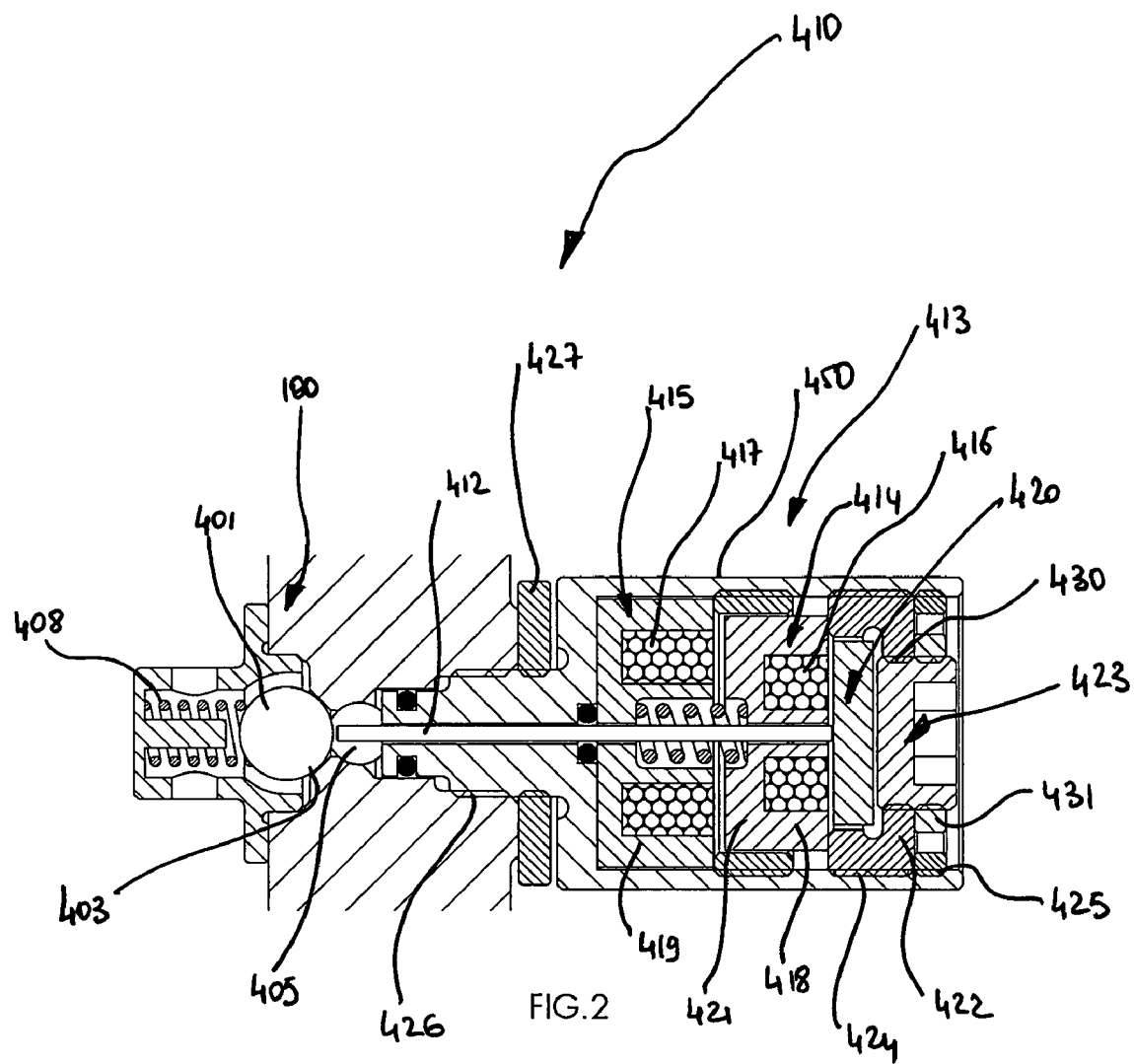
FIG. 2 is a view in section showing an electromechanical actuator of the ball-lift or valve-element-lift device for adjusting the compression ratio according to the present invention.
Figure 3:
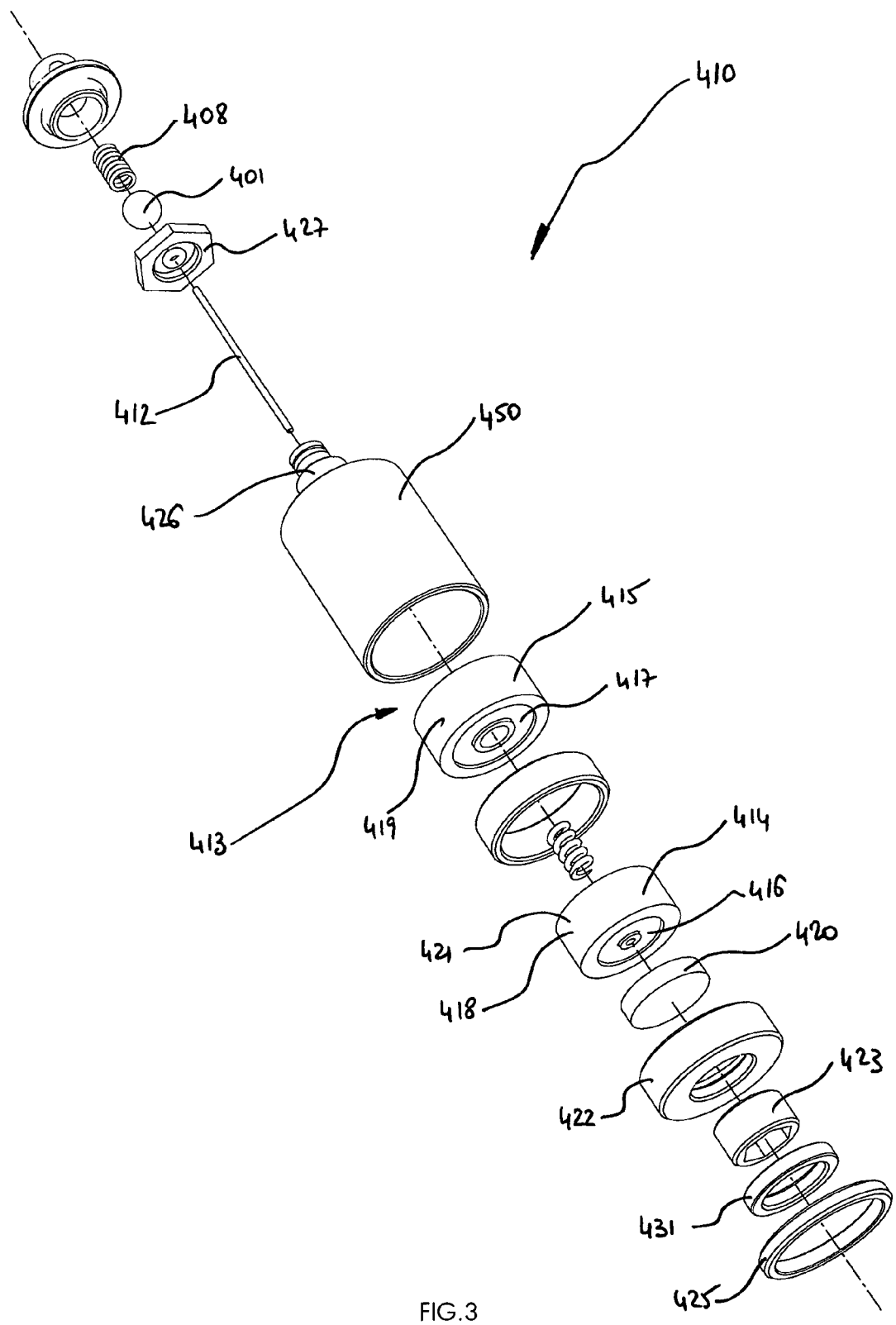
FIG. 3 is an exploded view in perspective representing the electromechanical actuator of the ball-lift or valve-element-lift device for adjusting the compression ratio according to the present invention.
Figure 4:
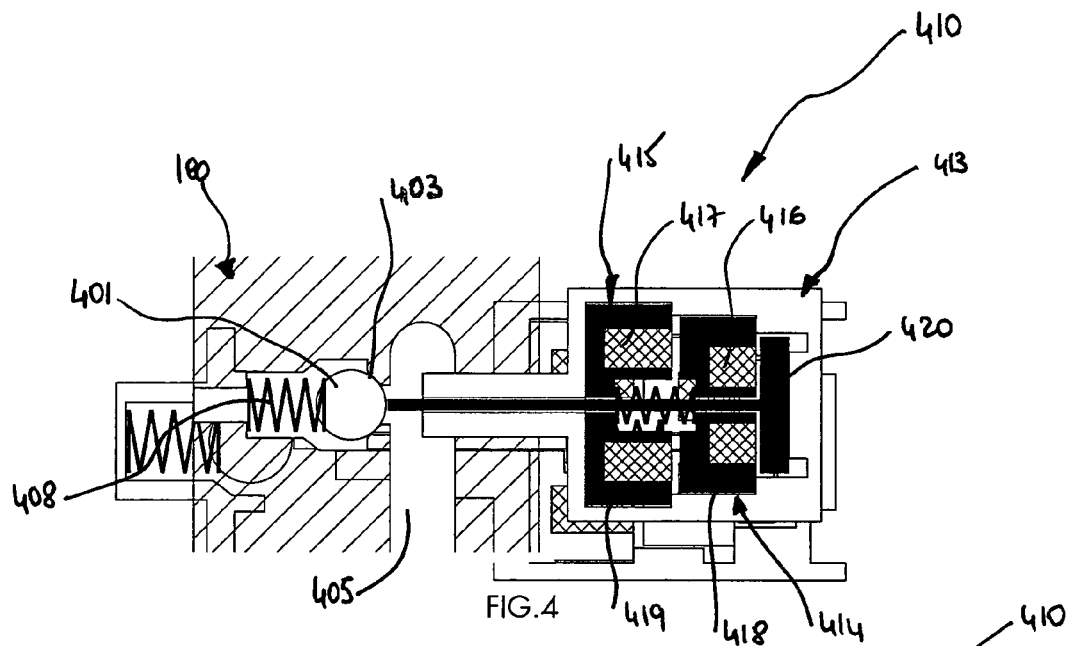
FIGS. 4 to 6 are schematic views illustrating the operating principle of the electromechanical actuator of the ball-lift or valve-element-lift device for adjusting the compression ratio according to the present invention.

FIGS. 2 and 3 show a nonlimiting exemplary embodiment of the electromechanical actuator 413 forming the lifting means 410 of the device 400 for adjusting the compression ratio.

A single electromechanical actuator 413 is shown driving the ball 401 from its seat 403 on the understanding that the other electromechanical actuator 413 lifting the other ball 402 from its seat 404 is identical.

Therefore, each electromechanical actuator 413 can be housed either directly inside the crankcase 100 of the variable compression ratio engine, or inside a cylindrical body 450 secured to the crankcase 100 of the variable compression ratio engine.

Each electromechanical actuator 413 consists of at least one electromagnetic suction cup 414, 415 comprising a winding 416, 417 and a cage 418, 419.

The winding 416 of the first electromagnetic suction cup 414 is used to create a magnetic field making it possible to attract a metal lifter armature 420 pushing the cylindrical lifter 412 when said winding 416 is traversed by an electric current.

The cylindrical lifter 412 housed in the transfer channel 405 is stopped in translation by a lifter abutment 423 which is placed in a direction opposite to that allowing said cylindrical lifter 412 to lift the ball 401, 402.

The distance between the lifter abutment 423 and the ball 401, 402 can be adjusted by means of a device 426, 427 for adjusting the ball clearance in order to make it possible to adjust the clearance between the cylindrical lifter 412 and said ball 401, 402 when said cylindrical lifter 412 and/or the metal lifter armature 420 is in contact with said lifter abutment 423.

The ball-clearance adjustment device consists of a thread 426 created directly or indirectly in the crankcase 100 of the variable compression ratio engine and making it possible to adjust the position of the lifter abutment 423 relative to that of the seat 403, 404 of the ball 401, 402.

The thread 426 forming the ball-clearance adjustment device can be stopped from rotating by locking means 427.

Provision is made for the cylindrical lifter 412 housed in the transfer channel 405 to be returned by a spring (not shown) which tends to move it away from the ball 401, 402.

Each electromechanical actuator 413 comprises, on the one hand, a first electromagnetic suction cup 414 making it possible to lift the ball 401, 402 over a small height and, on the other hand, a second electromagnetic suction cup 415 making it possible to lift said ball 401, 402 over a greater height.

The first electromagnetic suction cup 414 consists of a winding 416 and a metal cage 418 which can be attached to a metal supporting armature 421.

The maximum distance between the metal lifter armature 420 secured to or in contact with the cylindrical lifter 412 on the one hand, and the metal cage 418 of the first electromagnetic suction cup 414 on the other hand, can be adjusted by means of a first suction cup adjustment device 423, 430 so as to adjust the small lift height of the ball 401, 402.

The first electromagnetic suction cup adjustment device consists of a thread 430 making it possible to adjust the position of the abutment 423 secured directly or indirectly to the crankcase 100 of the variable compression ratio engine and on which the metal lifter armature 420 rests relative to the position of the metal cage 418, said thread 430 being able to be stopped from rotating by locking means 431.

The metal supporting armature 421 of the first electromagnetic suction cup 414 can move toward the ball 401, 402.

The maximum distance between the metal supporting armature 421 of the first electromagnetic suction cup 414 and the metal cage 419 of the second electromagnetic suction cup 415 can be adjusted by means of a second suction cup adjustment device 422, 424 so as to adjust the large lift height of the ball 401, 402.

The second suction cup adjustment device consists of a thread 424 making it possible to adjust the position of the abutment 422 of the metal supporting armature 421 relative to the position of the metal cage 419 of the second electromagnetic suction cup 415, said thread 424 being able to be stopped from rotating by locking means 425.

The winding 416 of said first suction cup 414 is used to create a magnetic field making it possible to attract the metal lifter armature 420 so as to push the cylindrical lifter 412 when said winding 416 is traversed by an electric current.

The second suction cup 415 consists of a winding 417 and a metal cage 419 which can be attached directly or indirectly to the crankcase 100 of the variable compression ratio engine.

The winding 417 of said second suction cup 415 is used to create a magnetic field so as to attract the metal supporting armature 421 of the first electromagnetic suction cup 414 when said winding 417 of said second suction cup 415 is traversed by an electric current.

Figure 7:
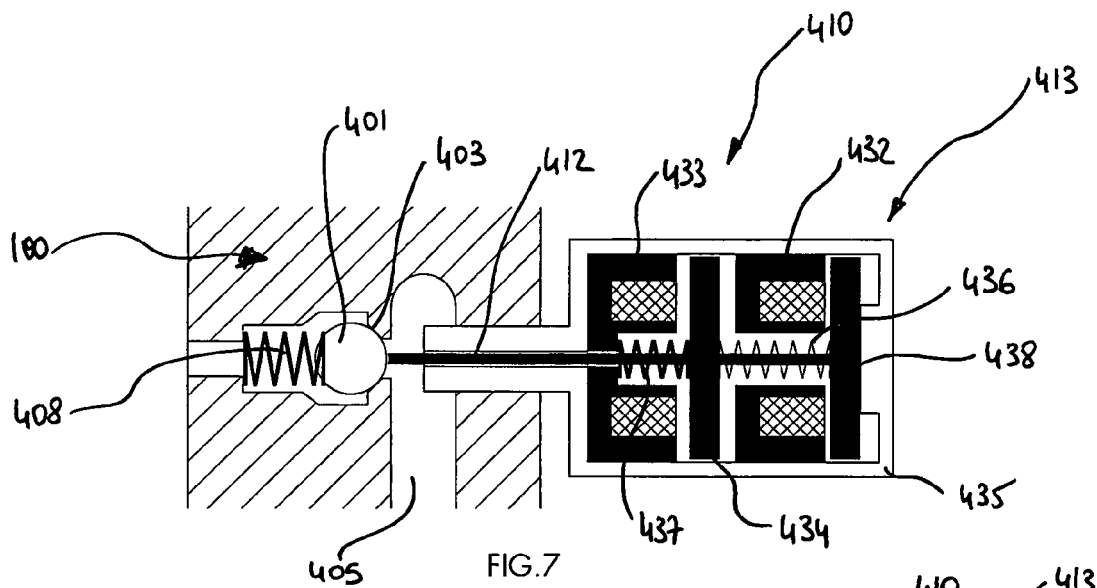
FIGS. 7 to 9 are schematic views illustrating the operating principle of a first variant of the electromechanical actuator of the ball-lift or valve-element-lift device for adjusting the compression ratio according to the present invention.
Figure 8:
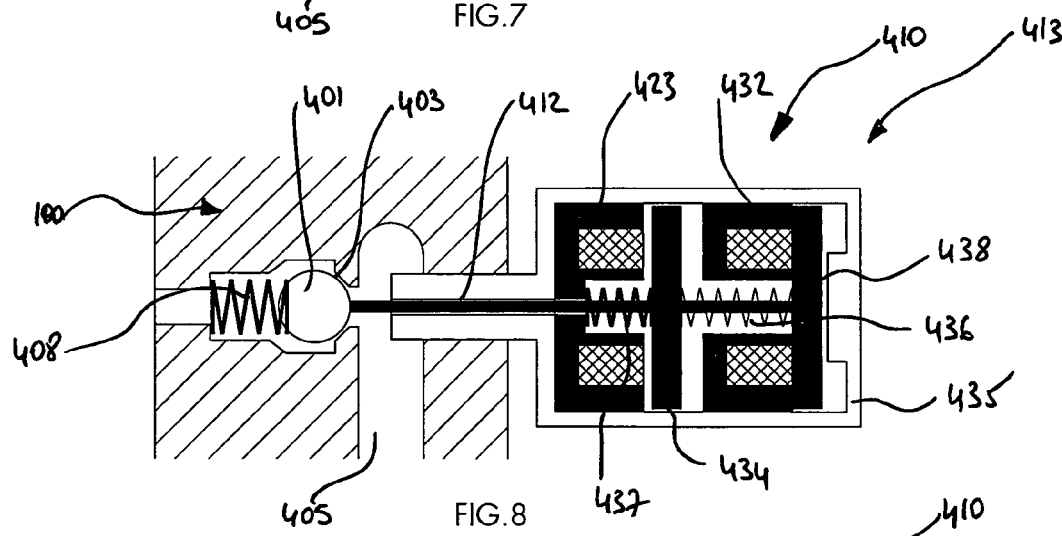
Figure 9:
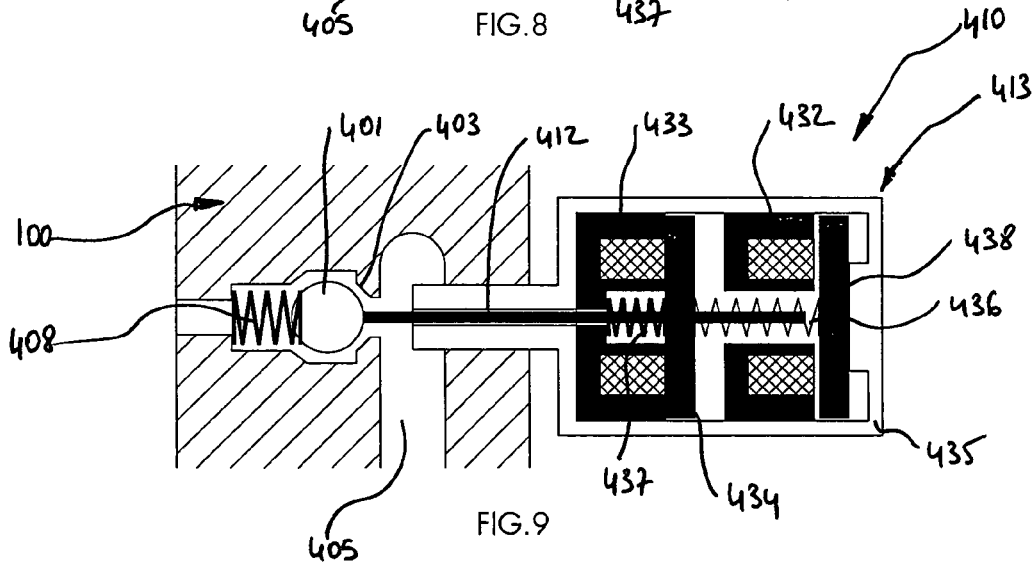

According to a first variant illustrated in FIGS. 7 to 9, the electromechanical actuator 413 forming the lifting means 410 of the device 400 for adjusting the compression ratio consists of a first electromagnetic suction cup 432 and a second electromagnetic suction cup 433 securely attached to the crankcase 100 of the variable compression ratio engine, said first suction cup 432 being able to attract a free small-lift armature 438 coming into contact with the cylindrical lifter 412, while the second electromagnetic suction cup 433 makes it possible to attract a large-lift armature 434 secured to said lifter.

The small-lift and large-lift electromagnetic suction cups 432, 433 are secured to the crankcase 100 by a cylindrical sheath 435 in which they are housed, said sheath 435 being screwed into said crankcase 100.

The free small-lift armature 438 comprises a return spring 436.

The large-lift armature 434 secured to the cylindrical lifter 412 comprises a return spring 437.

The small-lift electromagnetic suction cup 432 comprises adjustment means, not shown, making it possible to adjust the height of the small lift of the cylindrical lifter 412.

The large-lift electromagnetic suction cup 433 comprises adjustment means, not shown, making it possible to adjust the height of the large lift of the cylindrical lifter 412.

The cylindrical sheath 435 comprises adjustment means, not shown, making it possible to adjust the distance between the cylindrical lifter 412 and the ball 401, 402 when none of the electromagnetic suction cups 432, 433 is supplied with electric current.

Figure 10:
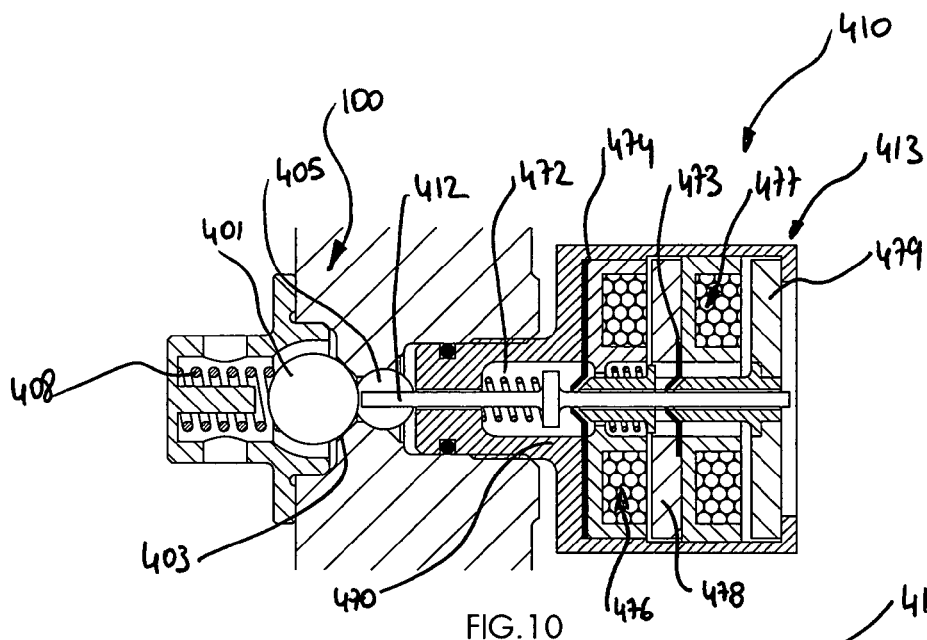
FIGS. 10 to 12 are schematic views representing a second variant of the electromechanical actuator of the device for adjusting the compression ratio making it possible to move incrementally and by a succession of small movements a cylindrical lifter making it possible to lift the ball or valve element.
Figure 11:
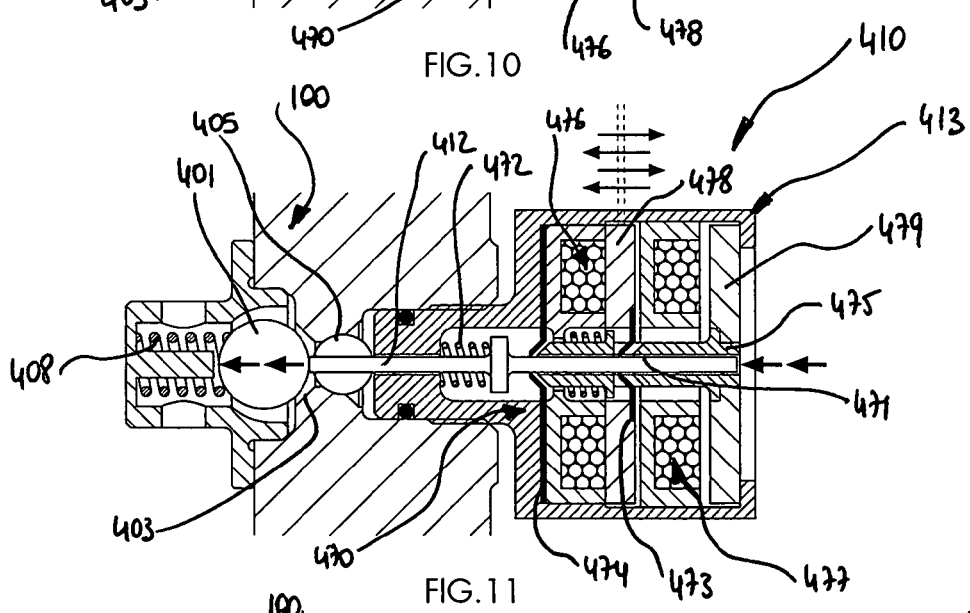
Figure 12:
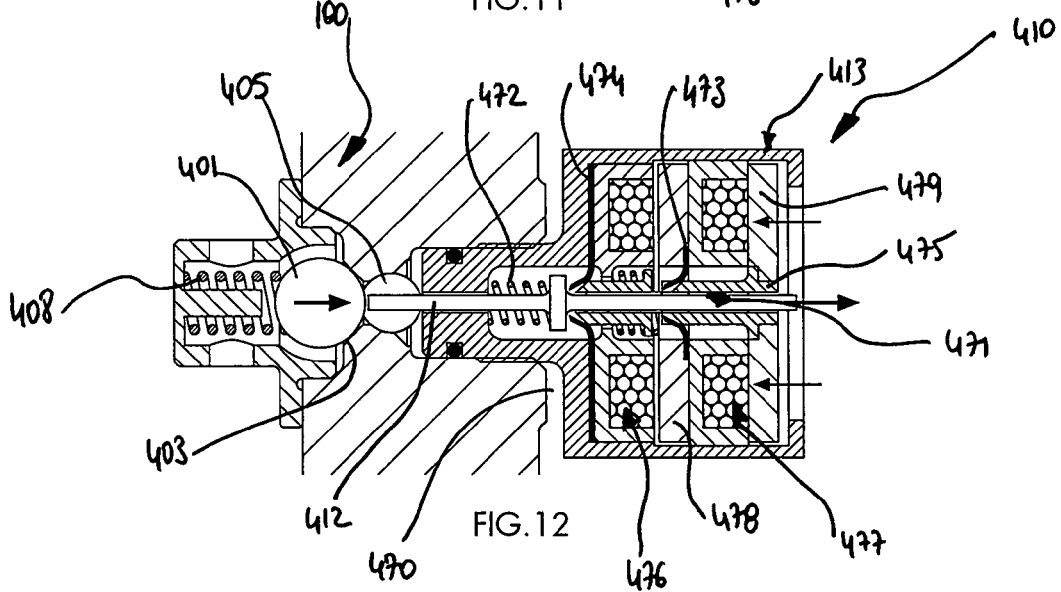
Figure 13:
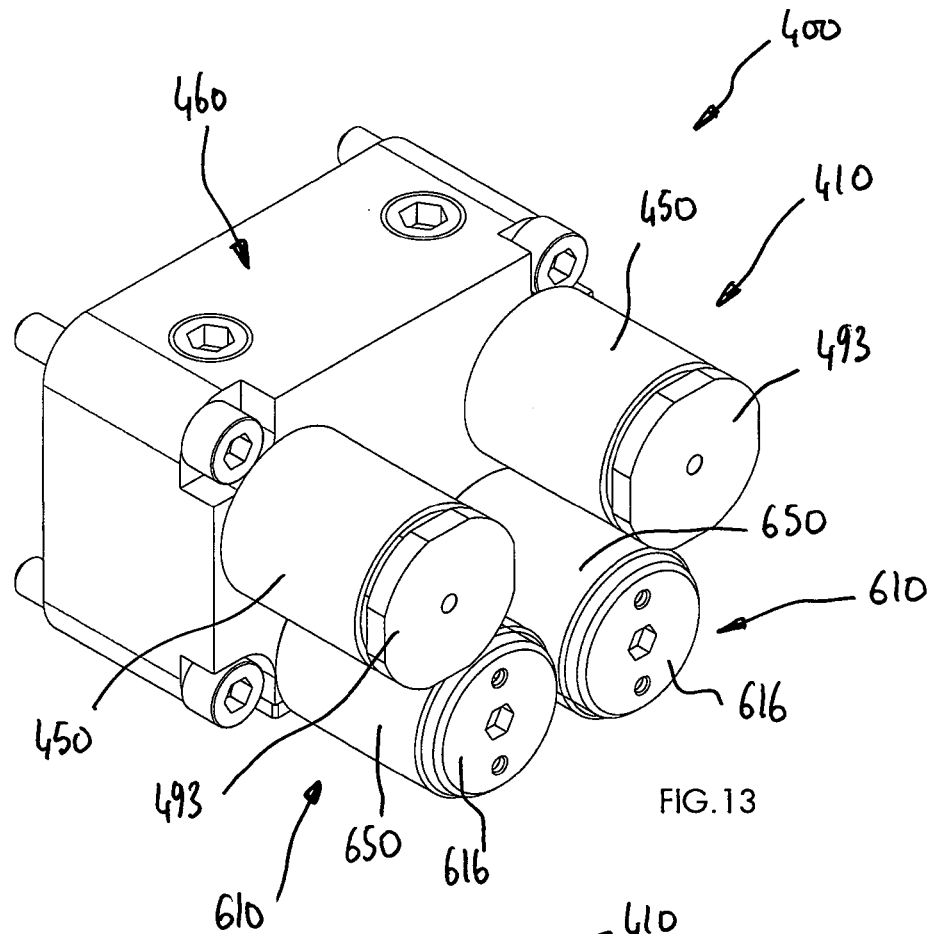
FIGS. 13 to 20 are views illustrating a variant of the ball-lift device for adjusting the compression ratio according to the present invention.
Figure 14:
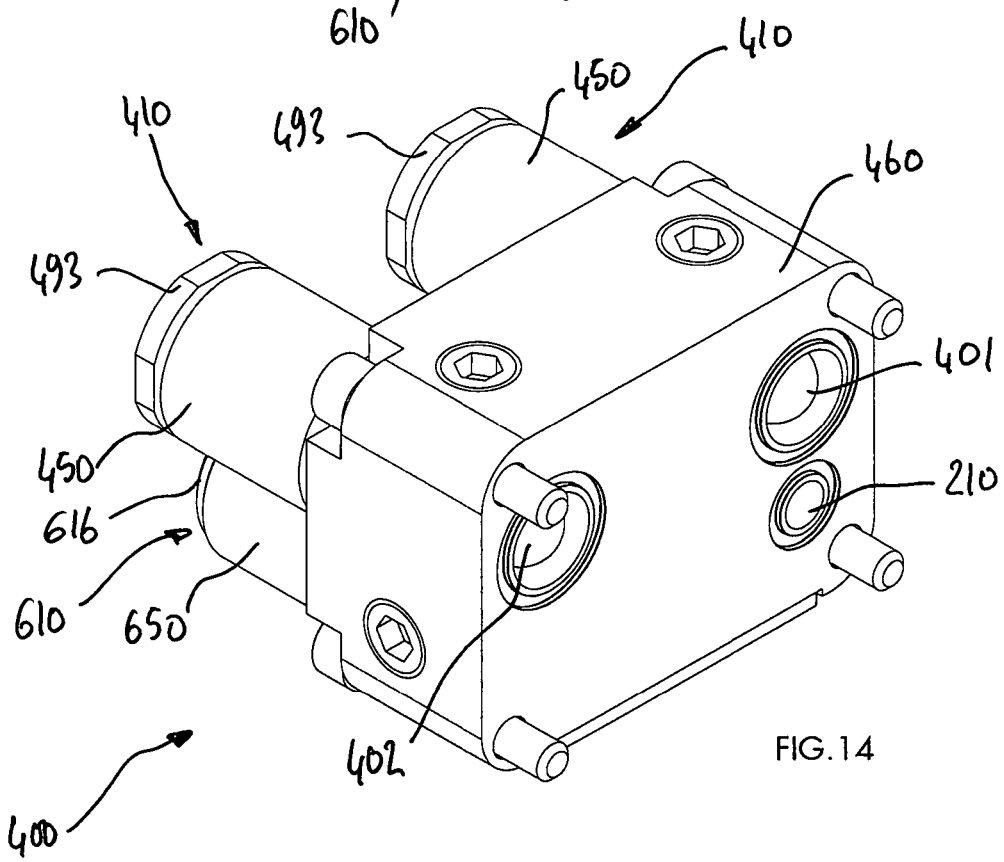
Figure 15:
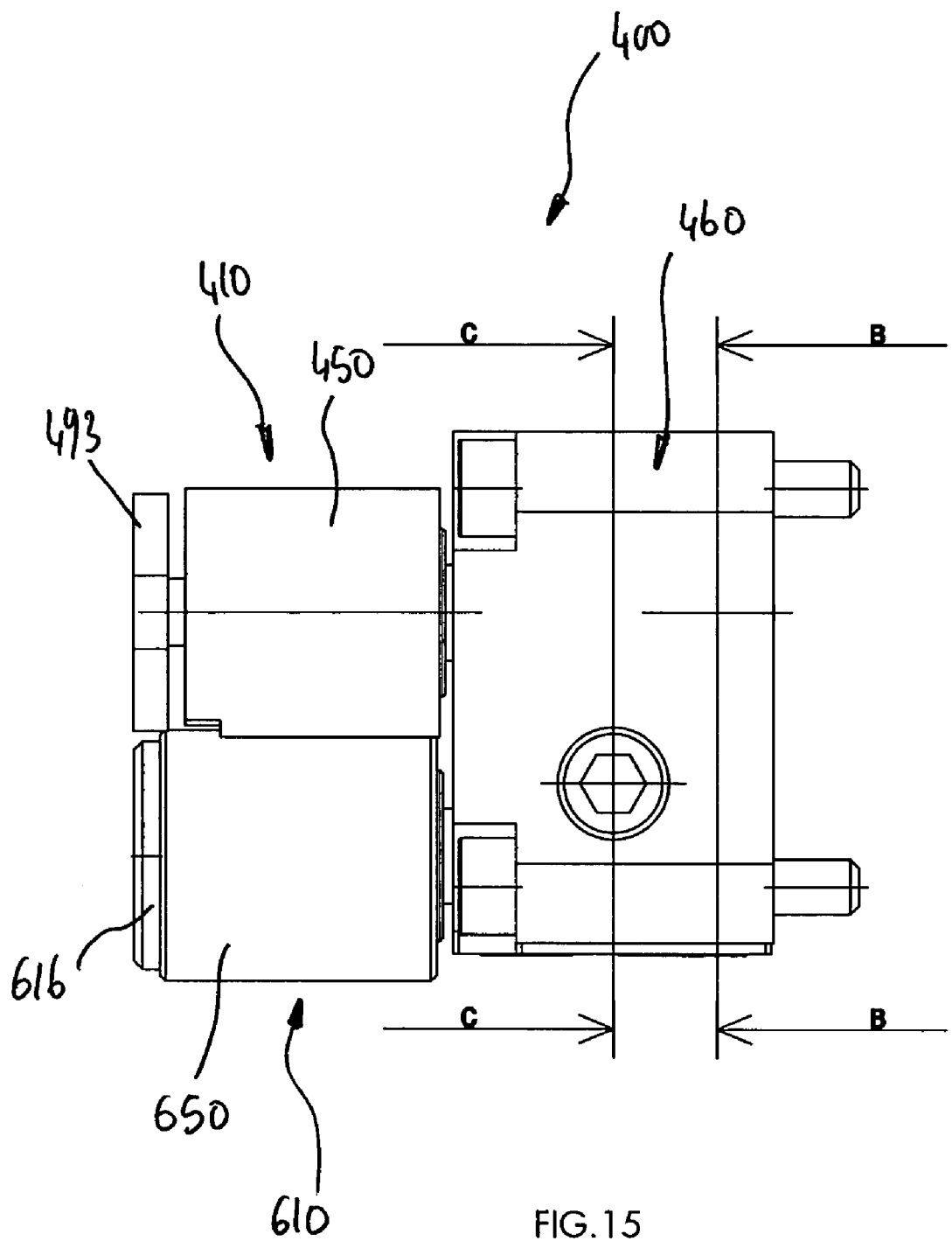
Figure 16:
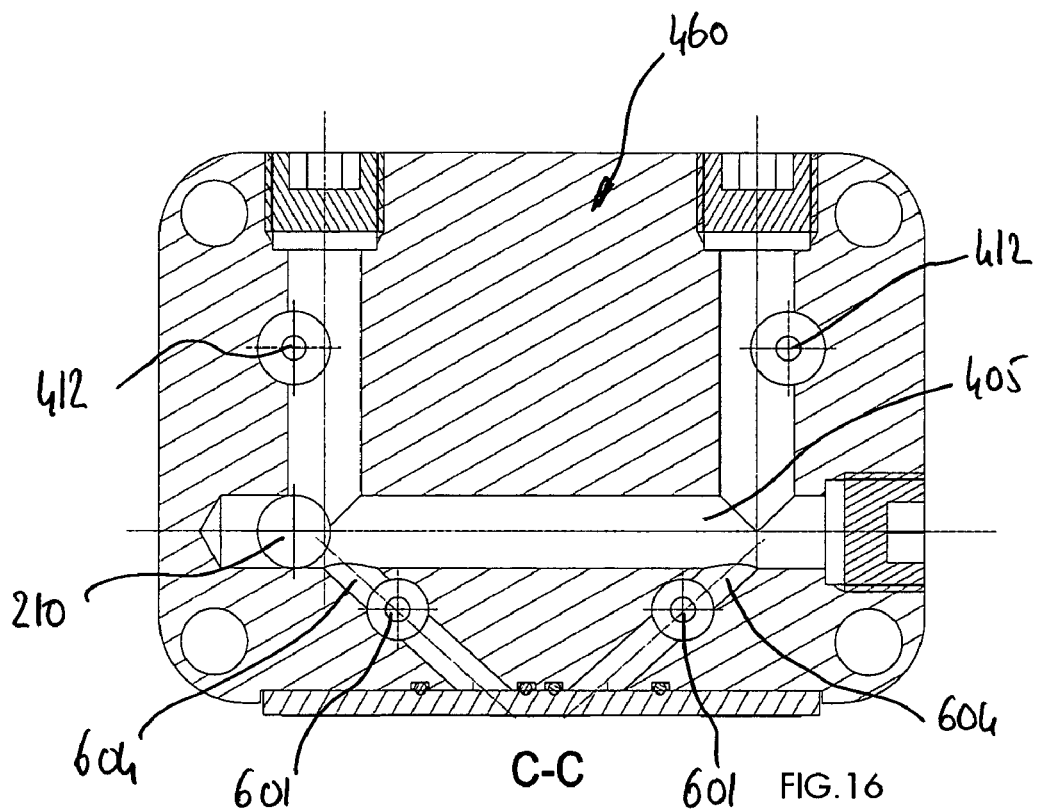
Figure 17:
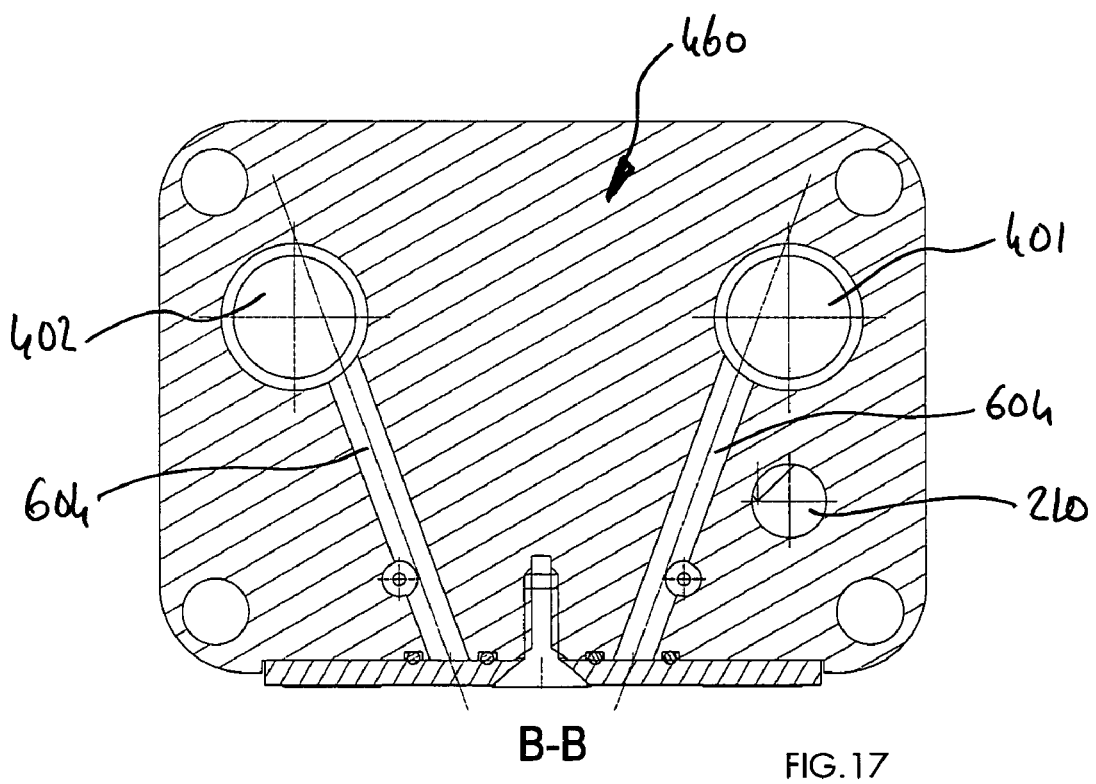
Figure 18:
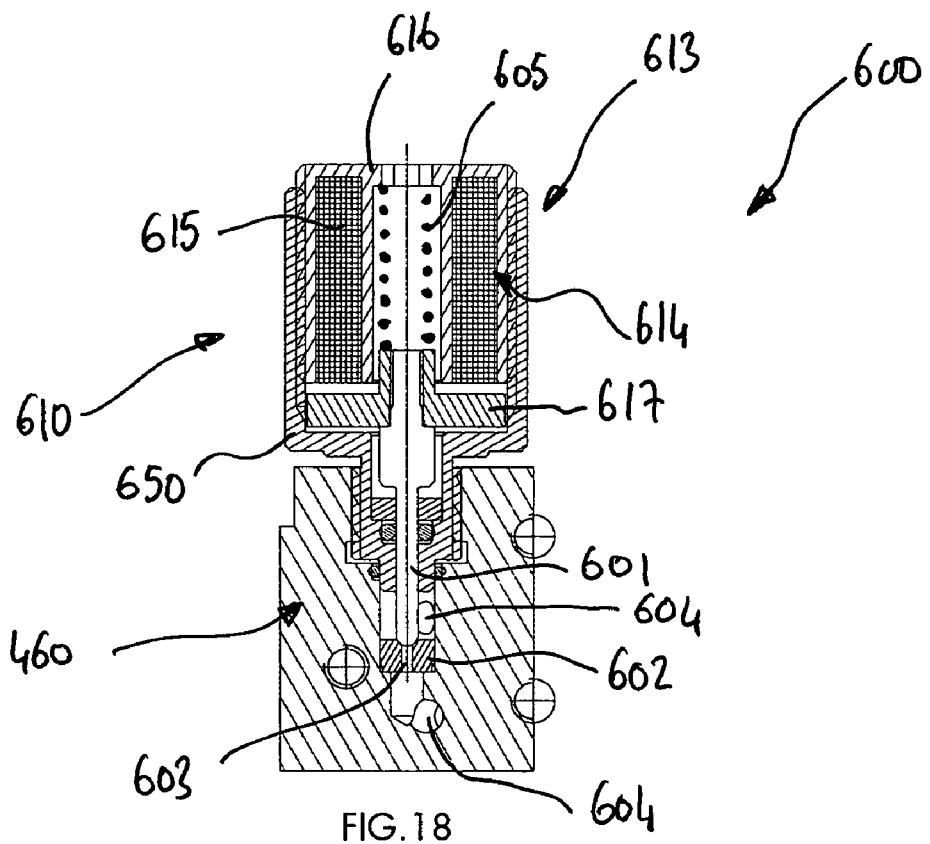
Figure 19:
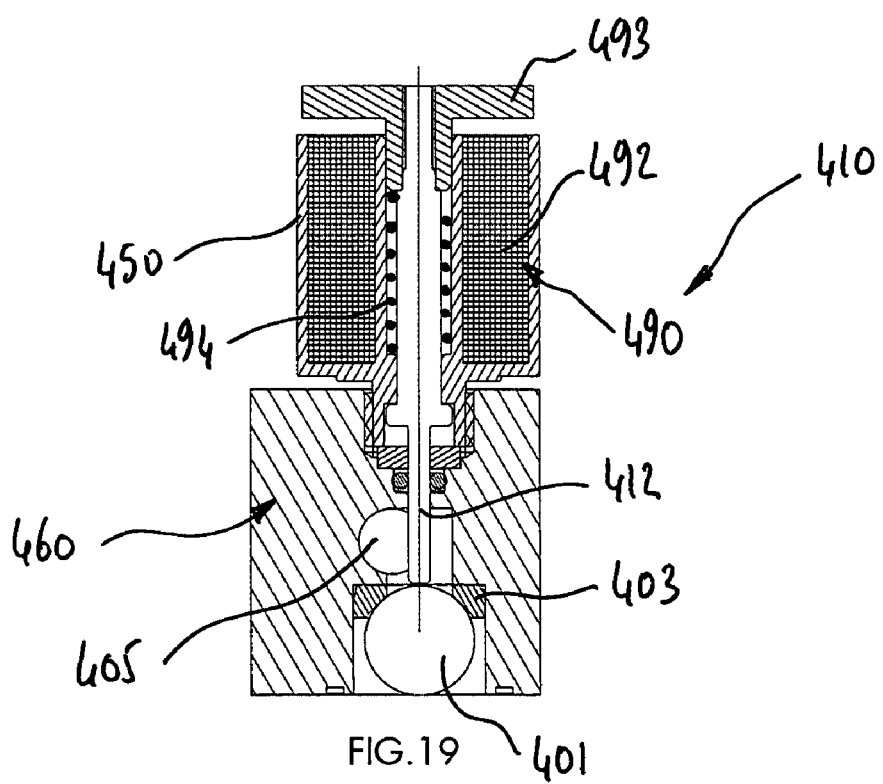
Figure 20:
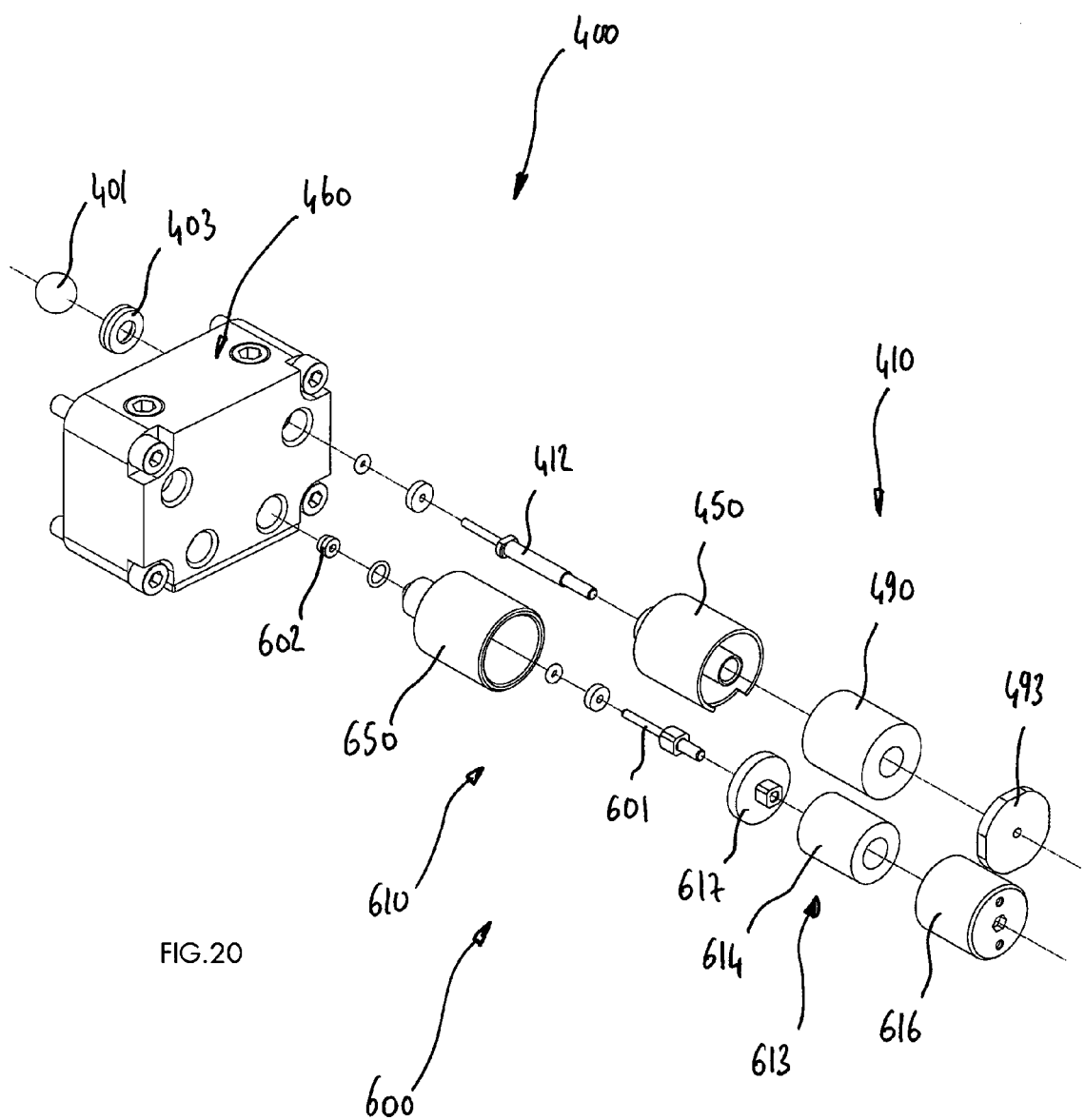

According to a second variant illustrated in FIGS. 10 to 12, the electromechanical actuator 413 forming the lifting means 410 of the device 400 for adjusting the compression ratio consists of at least one lift electromagnetic suction cup 476 making it possible to move a metal lift armature 478 which drives the cylindrical lifter 412 in an incremental manner and by a succession of small movements via a lifter nonreturn device 470.

The lifter nonreturn device 470 allows the cylindrical lifter 412 to move only toward the ball 401, 402.

The electromechanical actuator 413 comprises a system 471 for unlocking the lifter nonreturn device 470 allowing said cylindrical lifter 412 to return to its initial position under the action of a spring 472 and/or of the pressure prevailing in the transfer channel 405, said initial position allowing the ball 401, 402 to rest on its seat 403, 404.

The lifter nonreturn device 470 of the electromechanical actuator 413 consists of at least a first metal strip 473 secured to the metal lift armature 478 which drives the cylindrical lifter 412.

The metal strip 473 grips the body of said cylindrical lifter 412, which interacts with at least a second metal strip 474 secured to the crankcase 100 of the variable compression ratio engine and which also grips the body of said lifter.

The first and the second metal strip 473, 474 both allow the cylindrical lifter 412 to move toward the ball 401, 402, but not in the reverse direction.

The system 471 for unlocking the lifter nonreturn device 470 comprises strip lifting means 475 making it possible to simultaneously lift the first and the second metal strip 473, 474 so as to release the cylindrical lifter 412.

Note that the strip lifting means 475 can be actuated by at least one electromagnetic unlocking suction cup 477 which attracts a metal unlocking armature 479 secured to said lifting means.

According to a third variant, the electromechanical actuator 413 forming the lifting means 410 of the device 400 for adjusting the compression ratio consists of a stack of piezoelectric layers which, by their expansion under the effect of an electric current, can push the cylindrical lifter 412 so that said lifter lifts the ball 401, 402 or valve element from its seat 403, 404.

According to a fourth variant, the electromechanical actuator 413 forming the lifting means 410 of the device 400 for adjusting the compression ratio consists of an "H"-shaped piezoelectric motor creeping between two horizontal walls, the two vertical bars of the "H" in turn wedging said motor between said walls by modifying their length, while the horizontal bar of the "H" moves the motor also by modifying its length and by interacting in a synchronized manner with the length variations of the two vertical bars of the "H", said motor moving the cylindrical lifter 412 to which it is attached.

According to a fifth variant, the lifting means 410 of the device 400 for adjusting the compression ratio may consist of a cylindrical lifter 412 that can be moved in longitudinal translation by means of a piston-based hydraulic actuator, not shown, said actuator being able to use the pressure prevailing in the hydraulic power unit 200 of the variable compression ratio engine by means of a control solenoid valve in order to lift the ball 401, 402 from its seat 403, 404.

Equally, the device 400 for adjusting the compression ratio according to the present invention comprises a nonreturn valve element 428 making it possible to resupply the upper chamber 121 of the hydraulic double-acting control actuator 8. The resupply nonreturn valve element 428 allows the pressurized hydraulic fluid originating from the hydraulic power unit 200 of the variable compression ratio engine to enter the upper chamber 121 but not to leave it.

The ball-lift device 400 for adjusting the compression ratio according to the present invention comprises a nonreturn valve element 429 allowing the resupply of the lower chamber 122 of the hydraulic double-acting control actuator 8. The resupply nonreturn valve element 429 allows the pressurized hydraulic fluid originating from the hydraulic power unit 200 of the variable compression ratio engine to enter the lower chamber 122 but not to leave it.

Shown in FIGS. 13 to 20 is a variant of the device 400 for adjusting the compression ratio for a variable compression ratio engine comprising means for closing off at least one duct connecting the upper chamber 121 and lower chamber 122 of a hydraulic double-acting control actuator 8, and lifting means 410 making it possible to lift the closing-off means from their seat in order to allow the hydraulic fluid to pass in both directions.

The device 400 for adjusting the compression ratio according to the present invention comprises closing-off means that consist of at least two balls 401, 402 or valve elements each resting on a seat 403, 404 and respectively closing off one and the other end of a transfer channel 405, connecting, by means of ducts 406, 407 incorporated into the crankcase 100, the upper chamber 121 and the lower chamber 122 of the hydraulic double-acting control actuator 8.

The balls 401, 402 act as a nonreturn valve element when they are held on their seat 403, 404 by a spring 408, 409 so as to allow the hydraulic fluid to pass only in one direction.

The device 400 for adjusting the compression ratio according to the present invention comprises lifting means 410 making it possible to lift the balls 401, 402 from their seat 403, 404 in order to allow the hydraulic fluid to pass in both directions.

The lifting means 410 consist, for each ball 401, 402, of a cylindrical lifter 412 housed in the transfer channel 405.

The lifting means 410 consist of an electromechanical actuator 413 making it possible to move the cylindrical lifter 412 in longitudinal translation so that one of its ends comes into contact with, and then pushes, the corresponding ball 401, 402 so that it lifts from its seat 403, 404.

Only one electromechanical actuator 413 driving the ball 401 from its seat 403 is shown on the understanding that the other electromechanical actuator 413 lifting the other ball 402 from its seat 404 is identical.

Therefore, each electromechanical actuator 413 can be housed either directly inside the crankcase 100 of the variable compression ratio engine, or inside a cylindrical body 450 secured to the crankcase 100 of the variable compression ratio engine or to a plate 460 fitted to the crankcase 100 and comprising an inlet channel 210 from the hydraulic power unit 200.

In this particular case, each electromechanical actuator 413 consists, for example on the inside of the cylindrical body 450, of an electromagnetic suction cup 490 comprising a winding 492 creating a magnetic field making it possible to attract a lifting metal lifter armature 493 pushing the cylindrical lifter 412 when said winding 492 is traversed by an electric current.

The movement of the cylindrical lifter 412 makes it possible to move the corresponding ball 401, 402 in order to lift said ball from its seat 403, 404 and allow the hydraulic fluid to pass in both directions.

The lifting metal lifter armature 493 is secured to the cylindrical lifter 412 around which a return spring 494 is positioned making it possible to return said cylindrical lifter 412 to its original position when the coil 492 is no longer traversed by an electric current so that the corresponding ball 401, 402 rests against its seat 403, 404.

The device 400 for adjusting the compression ratio comprises, for each ball 401, 402, complementary closing-off means 600 which consist of a needle 601 that can rest on a seat 602, said needle being able to close off a connecting channel 604 originating from one or the other of the upper chamber 121 or lower chamber 122 leading into the transfer channel 405 connecting said upper chamber 121 and lower chamber 122 of the hydraulic double-acting control actuator 8, said connecting channel 604 being able to comprise a calibrated hole 603.

The calibrated hole 603 makes it possible to control the flow rate of oil passing through it and to ensure a better control of the flow rate.

The device 400 for adjusting the compression ratio according to the present invention comprises, for each needle 601 provided for each ball 401, 402, pulling means 610 making it possible to pull said needle 601 from its seat 602 in order to allow the hydraulic fluid to pass in both directions.

The pulling means 610 consist of an electromechanical actuator 613 making it possible to move the needle 601 in longitudinal translation so that one of its ends comes away from its seat 602 in order to allow the hydraulic fluid to pass in both directions.

Only one electromechanical actuator 613 making it possible to move the needle 601 from its seat 602, corresponding for example to the ball 401, is shown on the understanding that the other electromechanical actuator 613 corresponding to the other ball 402 and driving the other needle 601 from its seat 602 is identical.

Therefore, each electromechanical actuator 613 can be housed either directly inside the crankcase 100 of the variable compression ratio engine, or inside a cylindrical body 650 secured to the crankcase 100 of the variable compression ratio engine or secured to the plate 460 fitted to the crankcase 100.

In this particular case, each electromechanical actuator 613 consists, for example inside the cylindrical body 650, of an electromagnetic suction cup 614 comprising a winding 615 and a cage 616 attached inside the cylindrical body 650.

The winding 615 of said suction cup 614 is used to create a magnetic field making it possible to attract a metal armature 617 secured to the needle 601 and making it possible to pull said needle 601 when said winding 615 is traversed by an electric current.

Lifting the needle 601 from its seat 602 makes it possible to allow the hydraulic fluid to pass through the connecting channel 604.

In this particular arrangement, the device 400 for adjusting the compression ratio according to the present invention comprises closing-off means which consist of at least two balls 401, 402 and second complementary closing-off means 600 which consist, for each ball 401, 402, of a needle 601, said closing-off means being placed in parallel.

Therefore, the complementary closing-off means 600 make it possible, when the needle 601 is moved away from its seat 602, to ensure the passage of a small flow rate of oil causing a drop in pressure between the upstream and the downstream of the corresponding ball 401, 402 making it possible to reduce the force necessary to lift said ball from its seat 403, 404 and therefore in particular to provide an electromagnetic suction cup 490 of less power.

Moreover, the complementary closing-off means 600 make it possible to precisely control the control rack 7 of the variable compression ratio engine particularly when the latter is close to its setpoint position.

The prior movement of the needle 601 from its seat 602 also makes it possible to carry out only one height or lift level of the corresponding ball 401, 402, said ball 401, 402 now being used only to obtain a considerable flow rate of oil in the transfer channel 405.

Figure 21:
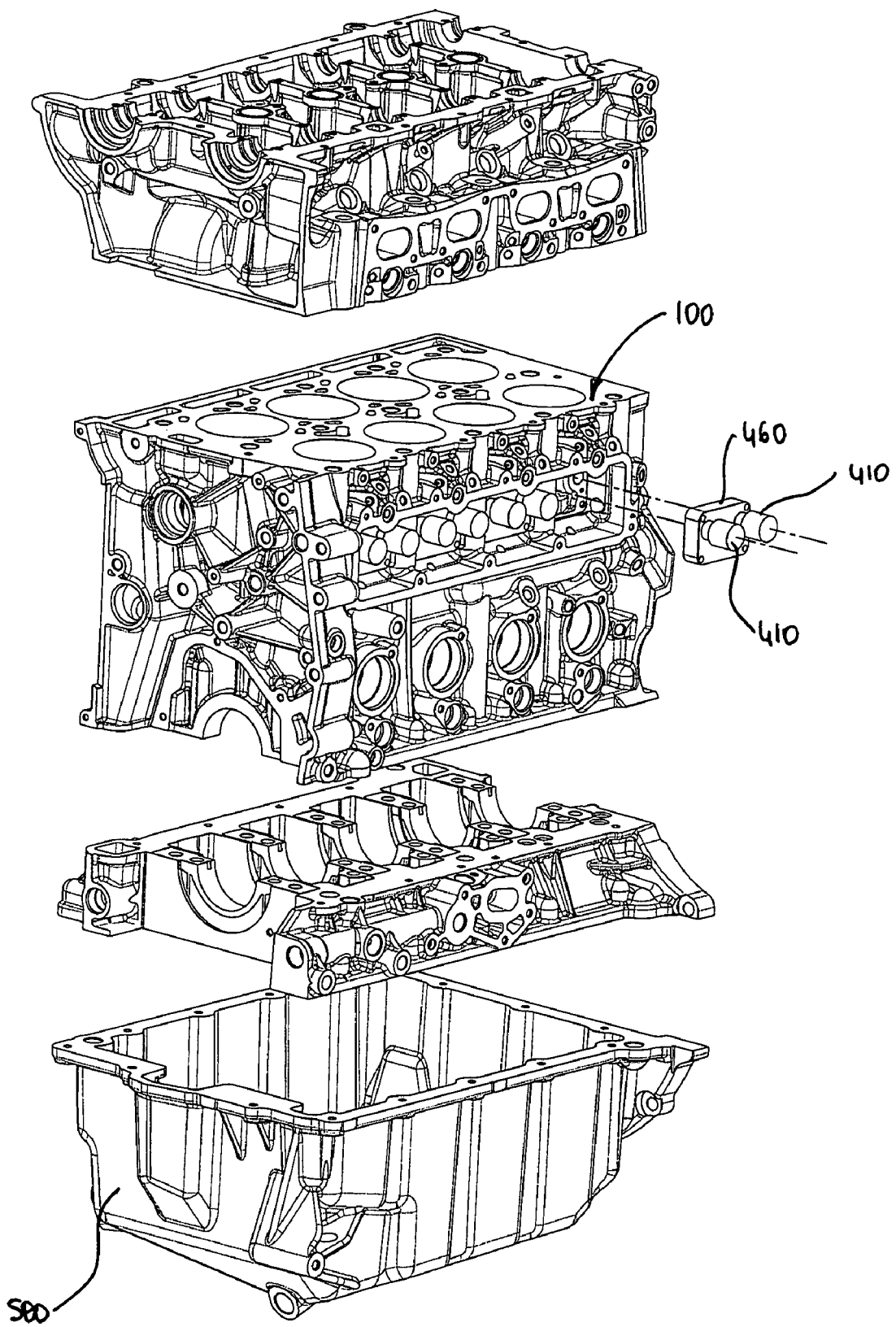
FIG. 21 is an exploded view in perspective showing the engine block of the variable compression ratio engine and the position of the ball-lift or valve-element-lift device for adjusting the compression ratio according to the present invention on said engine block.

FIG. 21 illustrates the device 400 for adjusting the compression ratio, with balls 401, 402 or valve elements comprising a plate 460 fitted to the crankcase 100 of the variable compression ratio engine in which the transfer channel 405 is created.

Equally, the plate 460 supports the means 410 for lifting the balls 401, 402 of the device 400 for adjusting the compression ratio and, depending on the case, the means 610 for pulling the needles 601. The plate 460 comprises means which ensure the seal between the transfer channel 405 and the ducts 406, 407, incorporated into the crankcase 100, with which said transfer channel 405 communicates.

Note that, according to a particular embodiment, the electromagnetic suction cup or cups may be driven in cyclic opening ratio or PWM (Pulse Width Modulation), this driving method making it possible to find intermediate positions between the position in which the armature of said suction cup(s) is furthest away from the coil of said suction cup, and the position in which it is closest to said coil.

Operation:

According to a particular embodiment, the operation of the ball-lift device 400 for adjusting the compression ratio for a variable compression ratio engine is as follows:

When the variable compression ratio engine is used at a given compression ratio and in the absence of any variation of said compression ratio, the two balls 401, 402, which make it possible respectively to allow the hydraulic fluid to pass from the upper chamber 121 to the lower chamber of the actuator 122 of the control actuator 8 and vice versa, rest on their seat 403, 404.

In this case, said fluid can move neither from the upper chamber 121 to the lower chamber 122 nor in the opposite direction, which has the effect of maintaining the position of the control actuator 8 of said engine at a determined value, and of keeping the compression ratio of said engine fixed.

Taking account of the operating conditions of the variable compression ratio engine, it is regularly necessary to adapt the compression ratio thereof. Depending on the case, this variation of the compression ratio of said engine is used to maximize the performance or the efficiency of said engine or else to improve the operation of the three-way catalytic converter thereof.

If, taking account of these various necessities, the computer 94 (ECU) of the variable compression ratio engine has to increase the compression ratio of said engine, it then sends an electric current to the electromechanical actuator 413 which is responsible for lifting the ball 402 of the lower chamber 122 of the control actuator 8, the precise effect of which is to lift said ball from its seat 404, said actuator 413 lifting said ball 402 by means of its cylindrical lifter 412.

Therefore, the lifting of the ball 402 from its seat 404 allows the hydraulic fluid to leave the lower chamber 122 of the control actuator 8 and to enter the upper chamber 121 via the transfer channel 405, the ball 401 of the upper chamber 121 of the control actuator 8 for its part allowing the hydraulic fluid to enter said upper chamber 121, but not allowing it to leave again because of its nonreturn effect.

As can be seen in FIG. 1, no hydraulic pump is necessary to move the actuator piston 13 of the control actuator 8.

Said movement is actually provided by the alternating forces that are impressed on said actuator piston 13 by the control rack 7 of the variable compression ratio engine to which said piston is attached, said rack 7 itself being subjected to the forces resulting from the pressure of the gases contained in the combustion chamber of the engine and/or to the forces resulting from the inertia of the main moving parts of said engine which are the gearwheel 5, the combustion piston 2, the piston rack 3 and its rolling guidance device 4.

As can be easily deduced on looking at FIG. 1, the movement of the actuator piston 13 of the control actuator 8 toward the lower chamber 122 causes an increase in the volume of the upper chamber 121 which is greater than the reduction in volume of the lower chamber 122, this resulting from the absence of an upper actuator rod which is replaced by a lock screw 132.

Because of this, the pressure in the upper chamber 121 reduces when the actuator piston 13 moves toward the lower chamber 122, and the resupply nonreturn valve element 428 of the upper chamber 121 allows the pressurized hydraulic fluid originating from the hydraulic power unit 200 of the variable compression ratio engine to enter said upper chamber 121.

Conversely, when the computer 94 (ECU) of the variable compression ratio engine has to reduce the compression ratio of said engine, it sends an electric current to the electromechanical actuator 413 which is responsible for raising the ball 401 of the upper chamber 121 of the control actuator 8, which has the effect of lifting said ball 401 from its seat 403, said actuator 413 lifting said ball by means of its cylindrical lifter 412.

Thus the lifting of the ball 401 from its seat 403 allows the hydraulic fluid to leave the upper chamber 121 of the control actuator 8 and to enter the lower chamber 122 of the control actuator 8 via the transfer channel 405, while the ball 402 of the lower chamber 122 of the control actuator 8 for its part allows the hydraulic fluid to enter said lower chamber 122 but does not allow it to leave again because of the nonreturn effect of said ball.

As can be easily deduced by looking at FIG. 1, the movement of the actuator piston 13 of the control actuator 8 toward the upper chamber 121 causes an increase in volume of the lower chamber 122 that is less than the reduction in volume of the upper chamber 121 because of the absence of the upper actuator rod replaced by the lock screw 132.

Because of this, the pressure in the chambers 121, 122 and in the transfer channel 405 becomes greater than that prevailing in the hydraulic power unit 200 when the actuator piston 13 moves toward the upper chamber 121. Consequently, the compensating nonreturn valve element 411, of which the outlet leads via a duct 480 into the hydraulic power unit 200, allows the pressurized hydraulic fluid originating from the upper chamber 121 to leave toward said hydraulic power unit via the transfer channel 405.

Note in this case that the volume of hydraulic fluid expelled by the control actuator 8 to the hydraulic power unit 200 via the compensating nonreturn valve element 411 is approximately equal to the difference between the volume of the upper chamber 121 swept by the actuator piston 13 and the volume of the lower chamber 122 simultaneously swept by said piston 13 during the movement operation carried out by said piston, said operation being designed to reduce the compression ratio of the variable compression ratio engine.

As can be seen, the combined action of the balls 401, 402 and of the alternating forces applied to the actuator piston 13 by the other movable components of the variable compression ratio engine defines an operation which is similar to that of a nonreturn ratchet, said piston 13 being able to move in the direction of the chamber 121 or 122 in the case in which the ball 401, 402 is kept open by its electromechanical actuator 413, but not in the reverse direction.

Whether it involves a movement designed to increase the compression ratio of the variable compression ratio engine or another designed to reduce it, the moment when the corresponding ball 401, 402 kept lifted by its actuator 413 is to be replaced on its seat 403, 404 is determined by the computer 94 (ECU) of the variable compression ratio engine.

Said moment is deduced by said computer 94 (ECU) based on the position of the control rack 7, said position for its part being returned by a position sensor 95 with which it interacts, and said sensor permanently measuring the vertical position of said rack 7.

Thus informed, the computer 94 (ECU) can replace the ball 401, 402 on its seat 403, 404 when said control rack 7 has reached the position corresponding to the compression ratio sought.

The interaction between the computer 94 (ECU) and the position sensor 95 of the control rack 7 also makes it possible to compensate for any drift in the position of said control rack 7 that may result from various leaks, whether it involves a leak between the upper chamber 121 and lower chamber 122 of the control actuator 8 due to a sealing defect of the gasket of the actuator piston 13, or whether it involves leaks between any one of said chambers 121, 122 and the outside of the control actuator 8.

In this case, the computer 94 (ECU) can instruct the temporary lifting of the ball 401, 402 of the chamber opposite to the direction of the drift of the actuator piston 13 until said piston returns to the required position.

When a leak occurs between any one of the chambers, the upper chamber 121 and/or lower chamber 122, and the outside of the control actuator 8, said actuator is resupplied with hydraulic fluid by the resupply nonreturn valve element 428 of the upper chamber 121, directly involving the upper chamber, or indirectly via said upper chamber and the transfer channel 405 when the ball 401 of said upper chamber 121 is open or slightly open, involving the lower chamber 122.

According to a particular embodiment of the device 400 for adjusting the compression ratio according to the invention, in addition to the position of the control rack 7 which is transmitted permanently to the computer 94 (ECU) by a position sensor 95, said computer can also be informed on the angular position of the crankshaft 9 of the variable compression ratio engine by the crankshaft angular sensor 93, known per se, of said engine.

According to this embodiment, the pressure difference between the upstream and the downstream of the ball 401 of the upper chamber 121 and the ball 402 of the lower chamber 122 when said balls 401, 402 rest on their seat 403, 404 will have been previously recorded in the memory of the computer 94 (ECU) for various angular positions of said crankshaft 9 corresponding to various points of speed and of load of the variable compression ratio engine.

These prerecorded values allow the computer 94 (ECU) to deduce the pressure difference between the upstream and the downstream of the balls 401, 402 of the upper chamber 121 and of the lower chamber 122 of the control actuator 8 at every point of speed and of load of said engine and for every angular position of the crankshaft 9.

According to this embodiment, the computer 94 (ECU) can initiate the lifting of the ball 401, 402 of the upper chamber 121 or lower chamber 122 of the control actuator 8 at an angle of crankshaft 9 corresponding to a slight pressure difference between the upstream and the downstream of said ball in order to allow the lifting of said ball 401, 402 from its seat 403, 404 by its electromechanical actuator 413 without requiring said actuator to produce a high pushing force on the cylindrical lifter 412.

Moreover, according to this embodiment, the computer 94 (ECU) can anticipate the behavior of the control actuator 8 with good accuracy because said computer 94 (ECU) then has the information necessary to predict the number of degrees of rotation of the crankshaft 9 that are required to allow the quantity of hydraulic fluid to pass between the ball 401, 402 of the upper chamber 121 or lower chamber 122 of the control actuator 8 and its seat 403, 404 which allows the actuator piston 13 to reach its new positional setpoint.

The computer 94 (ECU) can therefore deduce therefrom the height and the duration of the lift of the ball 401, 402 on its seat 403, 404 that are necessary for the actuator piston 13 to reach its new positional setpoint.

Note that the height and the lift of the ball 401, 402 may be corrected by the computer 94 (ECU) as a function of the viscosity of the hydraulic fluid, in order to increase the precision of positioning of the actuator piston 13. Said viscosity can notably be deduced by the computer 94 (ECU) based on the temperature of the hydraulic fluid, said temperature for its part being transmitted by a sensor, not shown.

Figure 5:
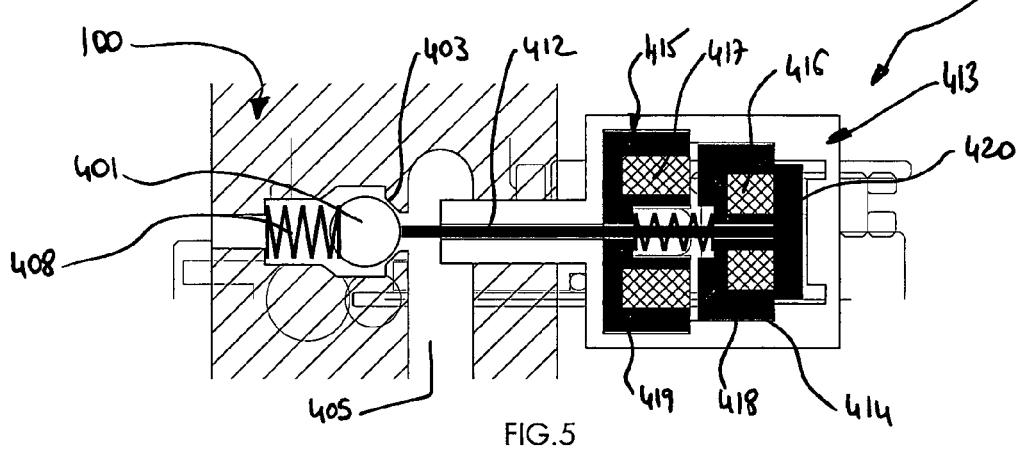
Figure 6:
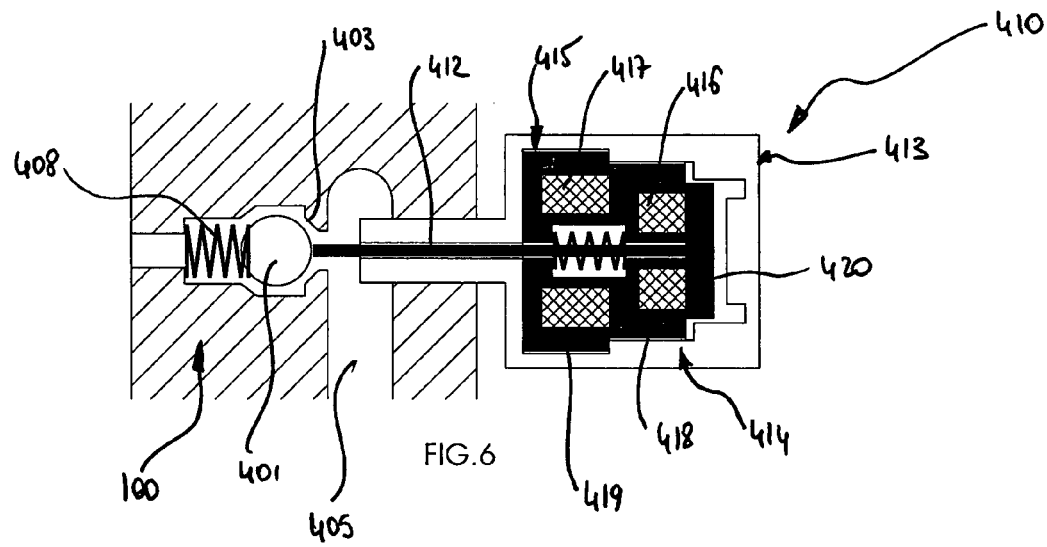

Note that, according to a particular embodiment, each electromechanical actuator 413 which lifts the balls 401, 402 of the upper chamber 121 or lower chamber 122 of the control actuator 8 from their seat 403, 404 allows two lift heights of said balls, a small lift height (FIGS. 5, 8) and a large lift height (FIGS. 6 and 9).

For a given force applied to the actuator piston 13 of the control actuator 8 by the control rack 7, the large lift makes it possible to obtain a high speed of movement of said piston, while the small lift makes it possible to obtain a low speed of movement of said piston.

Said high speed makes it possible to go rapidly from a position of the actuator piston 13 that is far away from the setpoint position to another position adjacent to said setpoint position, while said low speed makes it possible to go from said position adjacent to said setpoint position to said setpoint position.

Said low speed can also be used to compensate for the slow drift of the actuator piston 13 induced by possible leaks, or to go from one setpoint position to another setpoint position when said positions are close to one another.

According to a particular embodiment of the device 400 for adjusting the compression ratio according to the invention, this result can be obtained by giving the electromechanical actuator 413 two electromagnetic suction cups 414, 415. The first electromagnetic suction cup 414 providing the small lift of the ball 401, 402 of the upper chamber 121 or lower chamber 122 of the control actuator 8, while the second electromagnetic suction cup 415 provides the large lift thereof.

To achieve a small lift, the computer 94 (ECU) of the variable compression ratio engine supplies the first electromagnetic suction cup 414 of the electromechanical actuator 413 with electric current which has the effect of attracting and then magnetically sticking the metal lifter armature 420 to the cage 418 of said first suction cup 414. The movement of the metal lifter armature 420 makes it possible to push the cylindrical lifter 412 toward the ball 401, 402 in order to lift said ball over a low height (FIG. 5).

To achieve a large lift, the computer 94 (ECU) of the variable compression ratio engine supplies the first electromagnetic suction cup 414 of the electromechanical actuator 413 with electric current, thus achieving a small lift of the ball 401, 402, while simultaneously or immediately afterward said computer 94 (ECU) supplies the second electromagnetic suction cup 415 of said electromechanical actuator 413 with electric current (FIG. 6).

The effect of this is to attract and then magnetically stick the metal supporting armature 421, to which the cage 418 of the first electromagnetic suction cup 414 is attached, to the cage 419 of the second electromagnetic suction cup 415. The total of the movements of the metal lifter armature 420 toward the cage 418 of the first electromagnetic suction cup 414 which pushes the cylindrical lifter 412 and of the metal supporting armature 421 of the first electromagnetic suction cup 414 toward the cage 419 of the second electromagnetic suction cup 415 makes it possible to achieve a large lift of the ball 401, 402 (FIG. 6).

It is noted that, when the variable compression ratio engine has been stopped for a certain time, the air dissolved or mixed with the hydraulic fluid tends to separate from said fluid.

Because of its lesser density, said air tends to assemble to form air pockets above said fluid and does so both on the surface of said fluid that the lower chamber 122 of the control actuator 8 contains and on the surface of said fluid that the upper chamber 121 contains.

Because of their great compressibility, said air pockets can cause an instability of positioning of the actuator piston 13 and it is necessary to discharge them by means of the depressurizing device 133, 134 and 137 that the control actuator 8 comprises.

The depressurizing device carries the air which escapes from the surface of the hydraulic fluid contained in the lower chamber 122 of the control actuator 8 to the upper chamber 121 via the piston depressurizing duct 133 and the capillary duct 134 created in the actuator piston 13 and which connect the lower chamber 122 and the upper chamber 121 of the control actuator 8.

Once all of the air contained in the control actuator 8 is assembled in a pocket on the surface of the hydraulic fluid contained in the upper chamber 121, said air is discharged by the depressurizing solenoid valve 138 when the variable compression ratio engine is started.

To obtain this result, said solenoid valve 138 opens the depressurizing duct 137 of the control actuator 8 the inlet of which is positioned at the highest point of the upper chamber 121 and the outlet of which opens into any point of said engine, said point being directly or indirectly connected to the oil sump 500 of said engine.

The depressurizing solenoid valve 138 opens said depressurizing duct 137 for the time necessary to totally discharge said air pocket formed in the upper chamber 121 of the control actuator 8.

The depressurizing duct 133, and particularly the capillary duct 134, which are created in the actuator piston 13 and which connect the lower chamber 122 and the upper chamber 121 of the control actuator 8, have a small passageway section which forms a considerable pressure loss. Said pressure loss limits the passage of the oil between the upper chamber 121 and lower chamber 122, but allows the air contained in the lower chamber 122 to pass rapidly to the upper chamber 121.

However, said depressurizing duct 133 and the capillary duct 134 created in the actuator piston 13 cause a drift of said piston, said drift being compensated for by the computer 94 (ECU) which regularly repositions said piston by lifting, depending on the case, the ball 401, 402 of the upper chamber 121 and/or of the lower chamber 122 of the control actuator 8.

When the variable compression ratio engine is started, its temperature increases as does that of the hydraulic fluid which its control actuator 8 contains. This temperature increase tends to increase the pressure that said fluid applies to the inner walls of said actuator, because of the expansion of said fluid under the effect of said temperature.

To control said pressure, the computer 94 (ECU) of the variable compression ratio engine cyclically slightly varies the positional setpoint of the actuator piston 13 so that the excess volume of fluid can return to the hydraulic power unit 200 of said engine via the compensating nonreturn valve element 411, said valve element allowing said fluid to leave the transfer channel 405 in order to return to said power unit 200 but preventing said fluid from returning to said transfer channel 405.

According to a particular embodiment, the electromechanical means for lifting or pulling the balls 401, 402 or the needle 601 can be stepped.

In this case, the pressure prevailing in the hydraulic power unit 200 of the variable compression ratio engine is used to lift the balls 401, 402 or pull the needles 601 by means of a hydraulic actuator.

According to this variant, the electromechanical means are used to place the pressurized oil contained in said hydraulic power unit 200 in contact with said hydraulic actuator on the one hand, or to place in contact the hydraulic actuator in contact with the oil sump of the engine on the other hand.

It should moreover be understood that the foregoing description has been given only as an example and that it in no way limits the scope of the invention which would not be departed from by replacing the described details of execution with any other equivalent.

The invention claimed is:

1. Device for adjusting the compression ratio of a variable compression ratio engine comprising a hydraulic double-acting control actuator (8) comprising an upper chamber (121) and a lower chamber (122) and at least one actuator piston (13) connected to a control rack (7), characterized in that it comprises:
at least two balls (401, 402) or valve elements each resting on a seat (403, 404) and closing off respectively one and the other end of a transfer channel (405) connecting the upper chamber (121) and the lower chamber (122) of the control actuator (8), said balls (401, 402) acting as a nonreturn valve element when they are held on their seat (403, 404) by a spring (408, 409) in order to allow the hydraulic fluid to pass in only one direction;
and lifting means (410) making it possible to raise the balls (401, 402) from their seat (403, 404) so that said balls allow the hydraulic fluid to pass in both directions.

2. Ball-lift device for adjusting the compression ratio for a variable compression ratio engine according to claim 1, characterized in that it comprises:
a control actuator (8) the actuator piston (13) of which is attached to the control rack (7) by a lock screw (132);
and at least one compensating nonreturn valve element (411) allowing the hydraulic fluid to come out of the transfer channel (405) in order to return to a hydraulic power unit (200) of the variable compression ratio engine containing a pressurized reserve (251) of said fluid, but preventing said fluid from returning to said transfer channel.

3. Ball-lift device for adjusting the compression ratio for a variable compression ratio engine according to claim 1, characterized in that the lifting means (410) consist of a cylindrical lifter (412) housed in the transfer channel (405), and an electromechanical actuator (413) making it possible to move said cylindrical lifter (412) in longitudinal translation so that its end comes into contact with and then pushes the ball (401, 402) so that it lifts from its seat (403, 404).

4. Ball-lift device for adjusting the compression ratio for a variable compression ratio engine according to claim 3, characterized in that the cylindrical lifter (412) is returned by a spring which tends to move it away from the ball (401, 402).

5. Ball-lift device for adjusting the compression ratio for a variable compression ratio engine according to claim 3, characterized in that the cylindrical lifter (412) is stopped in translation by a lifter abutment, said abutment being placed in a direction which is opposite to that allowing said cylindrical lifter (412) to lift the ball (401, 402).

6. Ball-lift device for adjusting the compression ratio for a variable compression ratio engine according to claim 5, characterized in that the distance between the lifter abutment and the ball (401, 402) can be adjusted by means of a ball-clearance adjustment device so as to make it possible to adjust the clearance between the cylindrical lifter (412) and said ball (401, 402) when said cylindrical lifter (412) is in contact with said lifter abutment.

7. Ball-lift device for adjusting the compression ratio for a variable compression ratio engine according to claim 6, characterized in that the device for adjusting the ball clearance consists of a thread created directly or indirectly in the crankcase (100) of the variable compression ratio engine and making it possible to adjust the position of the lifter abutment relative to that of the seat (403, 404) of the ball (401, 402), said thread being able to be stopped from rotating by locking means.

8. Ball-lift device for adjusting the compression ratio for a variable compression ratio engine according to claim 3, characterized in that the electromechanical actuator (413) is housed outside the transfer channel (405).

9. Ball-lift device for adjusting the compression ratio for a variable compression ratio engine according to claim 3, characterized in that the electromechanical actuator (413) consists of at least one electromagnetic suction cup comprising a winding and a cage attached directly or indirectly to the crankcase (100) of the variable compression ratio engine, said winding being used to create a magnetic field making it possible to attract a metal lifter armature pushing the cylindrical lifter (412) when said winding is traversed by an electric current.

10. Ball-lift device for adjusting the compression ratio for a variable compression ratio engine according to claim 9, characterized in that the electromechanical actuator (413) comprises a first electromagnetic suction cup (414, 432) making it possible to lift the ball (401, 402) over a small height, and a second electromagnetic suction cup (415, 433) making it possible to lift said ball (401, 402) over a greater height.

11. Ball-lift device for adjusting the compression ratio for a variable compression ratio engine according to claim 10, characterized in that the first electromagnetic suction cup (414) of the electromechanical actuator (413) consists of a winding (416) and a metal cage (418) that can be attached to a metal supporting armature (421), said metal supporting armature (421) being able to move toward the ball (401, 402) but being stopped in the opposite direction by a second suction cup adjustment device (422, 424) secured directly or indirectly to the crankcase (100) of the variable compression ratio engine.

12. Ball-lift device for adjusting the compression ratio for a variable compression ratio engine according to claim 10, characterized in that the second electromagnetic suction cup (415) of the electromechanical actuator (413) consists of a winding (417) and a metal cage (419) attached directly or indirectly to the crankcase (100) of the variable compression ratio engine, said winding (417) being used to create a magnetic field so as to attract the metal supporting armature (421) of the first electromagnetic suction cup (414) when said winding (417) of said second electromagnetic suction cup (415) is traversed by an electric current.

13. Ball-lift device for adjusting the compression ratio for a variable compression ratio engine according to claim 12, characterized in that the maximum distance between the metal supporting armature (421) of the first electromagnetic suction cup (414) and the metal cage (419) of the second electromagnetic suction cup (415) can be adjusted by means of a second suction cup adjustment device (422, 424) so as to adjust the large lift height of the ball (401, 402).

14. Ball-lift device for adjusting the compression ratio for a variable compression ratio engine according to claim 13, characterized in that the second suction cup adjustment device consists of a thread (424) making it possible to adjust the position of the abutment (422) of the metal supporting armature (421) relative to the position of the metal cage (419) of the second electromagnetic suction cup (415), said thread (424) being able to be stopped rotating by locking means (425).

15. Ball-lift device for adjusting the compression ratio for a variable compression ratio engine according to claim 10, characterized in that the maximum distance between a metal lifter armature (420) secured to or in contact with the cylindrical lifter (412) on the one hand and the metal cage (418) of the first electromagnetic suction cup (414) on the other hand can be adjusted by means of a first suction cup adjustment device (423, 430) so as to adjust the small lift height of the ball (401, 402).

16. Ball-lift device for adjusting the compression ratio for a variable compression ratio engine according to claim 15, characterized in that the first electromagnetic suction cup adjustment device consists of a thread (430) making it possible to adjust the position of the abutment (423) secured directly or indirectly to the crankcase (100) of the variable compression ratio engine and on which the metal lifter armature (420) rests relative to the position of the metal cage (418), said thread (430) being able to be stopped from rotating by locking means (431).

17. Ball-lift device for adjusting the compression ratio for a variable compression ratio engine according to claim 10, characterized in that the first electromagnetic suction cup (432) and the second electromagnetic suction cup (433) are securely attached to the crankcase (100) of the variable compression ratio engine, said first suction cup (432) being able to attract a free small-lift armature (438) coming into contact with the cylindrical lifter (412), while the second electromagnetic suction cup (433) makes it possible to attract a large-lift armature (434) secured to said lifter.

18. Ball-lift device for adjusting the compression ratio for a variable compression ratio engine according to claim 17, characterized in that the small-lift electromagnetic suction cup (432) and large-lift electromagnetic suction cup (433) are secured to the crankcase (100) by a cylindrical sheath (435) in which they are housed, said sheath (435) being screwed into said crankcase (100).

19. Ball-lift device for adjusting the compression ratio for a variable compression ratio engine according to claim 18, characterized in that the cylindrical sheath (435) comprises adjustment means making it possible to adjust the distance between the cylindrical lifter (412) and the ball (401, 402) when none of the electromagnetic suction cups (432, 433) is supplied with electric current.

20. Ball-lift device for adjusting the compression ratio for a variable compression ratio engine according to claim 17, characterized in that the free small-lift armature (438) comprises a return spring (436).

21. Ball-lift device for adjusting the compression ratio for a variable compression ratio engine according to claim 17, characterized in that the large-lift armature (434) secured to the cylindrical lifter (412) comprises a return spring (437).

22. Ball-lift device for adjusting the compression ratio for a variable compression ratio engine according to claim 17, characterized in that the small-lift electromagnetic suction cup (432) comprises adjustment means making it possible to adjust the height of the small lift of the cylindrical lifter (412).

23. Ball-lift device for adjusting the compression ratio for a variable compression ratio engine according to claim 17, characterized in that the large-lift electromagnetic suction cup (433) comprises adjustment means making it possible to adjust the height of the large lift of the cylindrical lifter (412).

24. Ball-lift device for adjusting the compression ratio for a variable compression ratio engine according to claim 3, characterized in that the electromechanical actuator (413) consists of at least one lift electromagnetic suction cup (476) making it possible to move a metal lifting armature (478) which moves the cylindrical lifter (412) in an incremental manner and by a succession of small movements via a lifter nonreturn device (470), said nonreturn device allowing the cylindrical lifter (412) to move only toward the ball (401, 402).

25. Ball-lift device for adjusting the compression ratio for a variable compression ratio engine according to claim 24, characterized in that the electromechanical actuator (413) comprises a system (471) for unlocking the lifter nonreturn device (470) allowing the cylindrical lifter (412) to return to its initial position under the action of a spring (472) and/or of the pressure prevailing in the transfer channel (405), said initial position allowing the ball (401, 402) to rest on its seat (403, 404).

26. Ball-lift device for adjusting the compression ratio for a variable compression ratio engine according to claim 25, characterized in that the lifter nonreturn device (470) of the electromechanical actuator (413) consists of at least a first metal strip (473) secured to the metal lifting armature (478) which moves the cylindrical lifter (412), said metal strip (473) gripping the body of said cylindrical lifter (412), which interacts with at least a second metal strip (474) secured to the crankcase (100) of the variable compression ratio engine and which also grips the body of said cylindrical lifter (412), the first and the second metal strip (473, 474) both allowing the cylindrical lifter (412) to move toward the ball (401, 402), but not in the opposite direction.

27. Ball-lift device for adjusting the compression ratio for a variable compression ratio engine according to claim 25, characterized in that the system (471) for unlocking the lifter nonreturn device (470) comprises strip lifting means (475) making it possible to simultaneously lift the first and the second metal strip (473, 474) so as to release the cylindrical lifter (412).

28. Ball-lift device for adjusting the compression ratio for a variable compression ratio engine according to claim 3, characterized in that the electromechanical actuator (413) consists of a stack of piezoelectric layers which, by their expansion under the effect of an electric current, can push the cylindrical lifter (412) so that said lifter lifts the ball (401, 402) from its seat (403, 404).

29. Ball-lift device for adjusting the compression ratio for a variable compression ratio engine according to claim 3, characterized in that the electromechanical actuator (413) consists of an "H"-shaped piezoelectric motor creeping between two horizontal walls, the two vertical bars of the "H" in turn wedging said motor between said walls by modifying their length, while the horizontal bar of the "H" moves the motor also by modifying its length and by interacting in a synchronized manner with the length variations of the two vertical bars of the "H", said motor moving the cylindrical lifter (412) to which it is attached.

30. Ball-lift device for adjusting the compression ratio for a variable compression ratio engine according to claim 3, characterized in that the electromechanical actuator (413)

consists, on the inside of the cylindrical body (450), of an electromagnetic suction cup (490) comprising a winding (492) creating a magnetic field making it possible to attract a lifting metal lifter armature (493) pushing the cylindrical lifter (412) when said winding (492) is traversed by an electric current in order to lift the ball (401, 402) over a single lift height.

31. Ball-lift device for adjusting the compression ratio for a variable compression ratio engine according to claim 1, characterized in that the lifting means (410) consist of a cylindrical lifter (412) and a piston-based hydraulic actuator making it possible to move said cylindrical lifter (412) in longitudinal translation, said piston-based hydraulic actuator being able to use the pressure prevailing in the hydraulic power unit (200) of the variable compression ratio engine by means of a control solenoid valve in order to lift the ball (401, 402) from its seat (403, 404).

32. Ball-lift device for adjusting the compression ratio for a variable compression ratio engine according to claim 1, characterized in that the actuator piston (13) of the hydraulic double-acting control actuator (8) comprises two elastic end-of-stroke abutments (130, 131) which determine the maximum stroke of said piston, the first elastic abutment (131) making it possible to limit the maximum compression ratio of the variable compression ratio engine when it comes into contact with the crankcase (100) of said engine, the second elastic abutment (130) making it possible to limit the minimum compression ratio of the variable compression ratio engine when it comes into contact with a cylinder head (300) of the control actuator (8) of said engine.

33. Ball-lift device for adjusting the compression ratio for a variable compression ratio engine according to claim 32, characterized in that the actuator piston (13) of the hydraulic double-acting control actuator (8) attached to the control rack (7) comprises, between the lower face of said piston (13) and the lower actuator rod (16) of the control rack (7), an adjustment washer (135) which makes it possible to adjust the position of said piston relative to said rack, so as to be able to adjust the compression ratio of the variable compression ratio engine when one or the other of the two elastic end-of-stroke abutments (130, 131) comes into contact either with the crankcase (100) of said engine, this being the first abutment (131), or with the cylinder head (300) of the control actuator (8) of said engine, this being the second abutment (130).

34. Ball-lift device for adjusting the compression ratio for a variable compression ratio engine according to claim 1, characterized in that the actuator piston (13) comprises a piston depressurizing duct (133) which connects the lower chamber (122) and the upper chamber (121) of the hydraulic double-acting control actuator (8), said duct allowing the air that can form a pocket in said lower chamber (122) to pass into said upper chamber (121).

35. Ball-lift device for adjusting the compression ratio for a variable compression ratio engine according to claim 34, characterized in that the piston depressurizing duct (133) consists of a space left between the actuator piston (13) and the lock screw (132) calculated to form a pressure loss limiting the flow rate of hydraulic fluid between the lower chamber (122) and the upper chamber (121) of the hydraulic double-acting control actuator (8).

36. Ball-lift device for adjusting the compression ratio for a variable compression ratio engine according to claim 34, characterized in that the piston depressurizing duct (133) of the actuator piston (13) comprises a considerable space left between the actuator piston (13) and the lock screw (132), said space allowing the hydraulic fluid to pass from the lower chamber (122) to the upper chamber (121) of the hydraulic double-acting control actuator (8), via a groove formed on the lower face of a depressurizing washer (136) clamped between said lock screw (132) and said actuator piston (13).

37. Ball-lift device for adjusting the compression ratio for a variable compression ratio engine according to claim 36, characterized in that the groove that the depressurizing washer (136) comprises is in spiral form in order to have a great length, the beginning of said spiral leading into the central hole of said washer, while the end of said spiral leads into the periphery of said washer.

38. Ball-lift device for adjusting the compression ratio for a variable compression ratio engine according to claim 34, characterized in that the piston depressurizing duct (133) consists of a depressurizing capillary duct (134) formed or fitted in the body of the lock screw (132) making it possible to attach the actuator piston (13) to the control rack (7), the profile, the cross section and the length of said capillary duct (134) being calculated to form a pressure loss limiting the passage of the hydraulic fluid between the lower chamber (122) and the upper chamber (121) of the control actuator (8).

39. Ball-lift device for adjusting the compression ratio for a variable compression ratio engine according to claim 1, characterized in that the hydraulic double-acting control actuator (8) comprises an actuator depressurizing duct (137) the inlet of which is positioned at the highest point of the upper chamber (121) and the outlet of which opens into any point of the variable compression ratio engine, said actuator depressurizing duct (137) being able to be closed off or opened by means of a depressurizing solenoid valve (138).

40. Ball-lift device for adjusting the compression ratio for a variable compression ratio engine according to claim 1, characterized in that it comprises a position sensor (95) which makes it possible to measure the vertical position of the control rack (7) of the variable compression ratio engine.

41. Ball-lift device for adjusting the compression ratio for a variable compression ratio engine according to claim 1, characterized in that it comprises a passage detection sensor which makes it possible to measure the moment of passage of a piston rack (3) of the variable compression ratio engine.

42. Ball-lift device for adjusting the compression ratio for a variable compression ratio engine according to claim 1, characterized in that it comprises a pressure sensor which makes it possible to measure the pressure that prevails in the upper chamber (121) of the control actuator (8) of the variable compression ratio engine.

43. Ball-lift device for adjusting the compression ratio for a variable compression ratio engine according to claim 1, characterized in that it comprises a pressure sensor which makes it possible to measure the pressure that prevails in a combustion chamber that the variable compression ratio engine comprises.

44. Ball-lift device for adjusting the compression ratio for a variable compression ratio engine according to claim 1, characterized in that it comprises an angular sensor (93) which makes it possible to measure the angular position of a crankshaft (9) that the variable compression ratio engine comprises.

45. Ball-lift device for adjusting the compression ratio for a variable compression ratio engine according to claim 1, characterized in that the upper chamber (121) of the control actuator (8) comprises a resupply nonreturn valve element (428), said valve element allowing the pressurized hydraulic fluid from the hydraulic power unit (200) of the variable compression ratio engine to enter said upper chamber (121), but not to leave it.

46. Ball-lift device for adjusting the compression ratio for a variable compression ratio engine according to claim 1, characterized in that the lower chamber (122) of the control actuator (8) comprises a resupply nonreturn valve element (429), said valve element allowing the pressurized hydraulic fluid from the hydraulic power unit (200) of the variable compression ratio engine to enter said lower chamber (122), but not to leave it.

47. Ball-lift device for adjusting the compression ratio for a variable compression ratio engine according to claim 1, characterized in that it comprises a plate (460) fitted to the crankcase (100) of the variable compression ratio engine in which the transfer channel (405) is formed, said plate comprising the means (410) for lifting the balls (401, 402) and sealing means providing the seal between said transfer channel (405) and ducts (406, 407) integrated into the crankcase (100).

48. Ball-lift device for adjusting the compression ratio for a variable compression ratio engine according to claim 1, characterized in that, for each of the balls (401, 402), it comprises:

complementary closing means (600) which consist of a needle (601) that can rest on a seat (602), said needle (601) being able to close off a connecting channel (604) originating from one or the other of the chambers, the upper chamber (121) or lower chamber (122), leading into the transfer channel (405) connecting said upper chamber (121) and lower chamber (122) of the hydraulic double-acting control actuator (8), and pulling means (610) making it possible to pull the needle (601) from its seat (602) in order to allow the hydraulic fluid to pass in both directions.

49. Ball-lift device for adjusting the compression ratio for a variable compression ratio engine according to claim 48, characterized in that the connecting channel (604) may comprise a calibrated hole (603) making it possible to control the flow rate of oil passing through it and to ensure a better control of the flow rate.

50. Ball-lift device for adjusting the compression ratio for a variable compression ratio engine according to claim 48, characterized in that the pulling means (610) consist of an electromechanical actuator (613) making it possible to move the needle (601) in longitudinal translation so that one of its ends comes away from its seat (602) in order to allow the hydraulic fluid to pass in both directions.

51. Ball-lift device for adjusting the compression ratio for a variable compression ratio engine according to claim 50, characterized in that the electromechanical actuator (613) consists, on the inside of a cylindrical body (650), of an electromagnetic suction cup (614) comprising a winding (615) and a cage (616) attached to the inside of said cylindrical body (650), said winding (615) of said suction cup (614) being used to create a magnetic field making it possible to attract a metal armature (617) secured to the needle (601) and making it possible to pull said needle (601) when said winding (615) is traversed by an electric current.

52. Ball-lift device for adjusting the compression ratio for a variable compression ratio engine according to claim 1, characterized in that the electromechanical means for lifting or pulling the balls (401, 402) or needles (601) may be stepped so that the pressure prevailing in the hydraulic power unit (200) of the variable compression ratio engine is used to lift the balls (401, 402) or pull the needles (601) by means of a hydraulic actuator.

* * * * *